(12) United States Patent
Miyatani et al.

(10) Patent No.: US 8,896,931 B2
(45) Date of Patent: Nov. 25, 2014

(54) ZOOM LENS AND IMAGE PICKUP APPARATUS

(71) Applicant: Sony Corporation, Tokyo (JP)

(72) Inventors: Sota Miyatani, Tokyo (JP); Masaki Tamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 34 days.

(21) Appl. No.: 13/734,160

(22) Filed: Jan. 4, 2013

(65) Prior Publication Data

US 2013/0188088 A1 Jul. 25, 2013

(30) Foreign Application Priority Data

Jan. 20, 2012 (JP) ................................. 2012-010220

(51) Int. Cl.
*G02B 15/14* (2006.01)
*G02B 15/173* (2006.01)

(52) U.S. Cl.
CPC .............. *G02B 15/14* (2013.01); *G02B 15/173* (2013.01)
USPC ......................................................... 359/687

(58) Field of Classification Search
CPC ........ G02B 1/041; G02B 15/00; G02B 15/14; G02B 15/15; G02B 15/16
USPC ........................... 359/676, 686, 687, 689, 690
See application file for complete search history.

(56) References Cited

U.S. PATENT DOCUMENTS 5,424,869 A * 6/1995 Nanjo ............................ 359/687

FOREIGN PATENT DOCUMENTS

| JP | 2004-272187 | 9/2004 |
| JP | 2009-204942 | 9/2009 |

* cited by examiner

*Primary Examiner* — Darryl J Collins
(74) *Attorney, Agent, or Firm* — Rader, Fishman & Grauer PLLC

(57) ABSTRACT

A zoom lens includes a first lens group having a positive refracting power and normally fixed in position, a second lens group having a negative refracting power and movable along an optical axis, and a third lens group having a positive refracting power and normally fixed in position, disposed in order from the object side to the image side. Two thirds or more of lenses of the first to third lens groups are formed from a resin material. The zoom lens satisfies the following conditional expressions (1) and (2):

$$4.0 < ft/fw \qquad (1)$$

$$-100.0 < f1 \text{ to } 3/fw < -6.4 \qquad (2)$$

where fw is a focal length of the entire lens system at the wide angle end, ft a focal length of the entire lens system at the telephoto end, and f1 to 3 a combined focal length of the first to third lens groups at all zoom positions.

4 Claims, 31 Drawing Sheets

WIDE ANGLE END(AT NORMAL TEMPERATURE(25°C))

FIG. 13
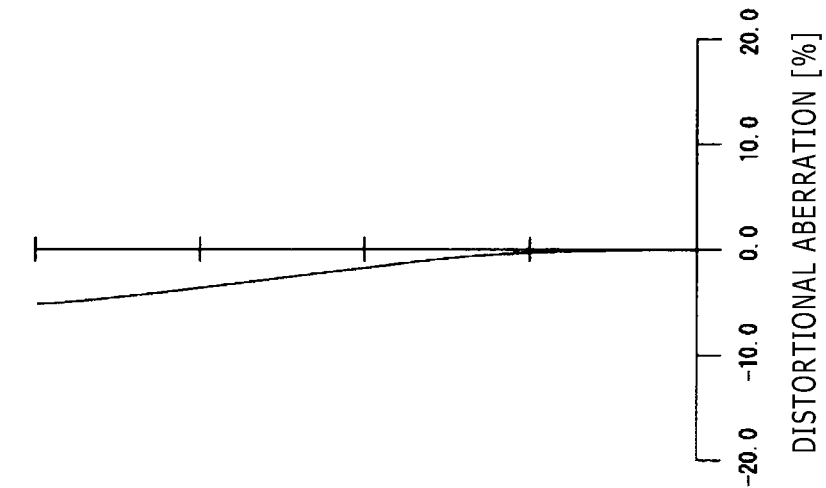
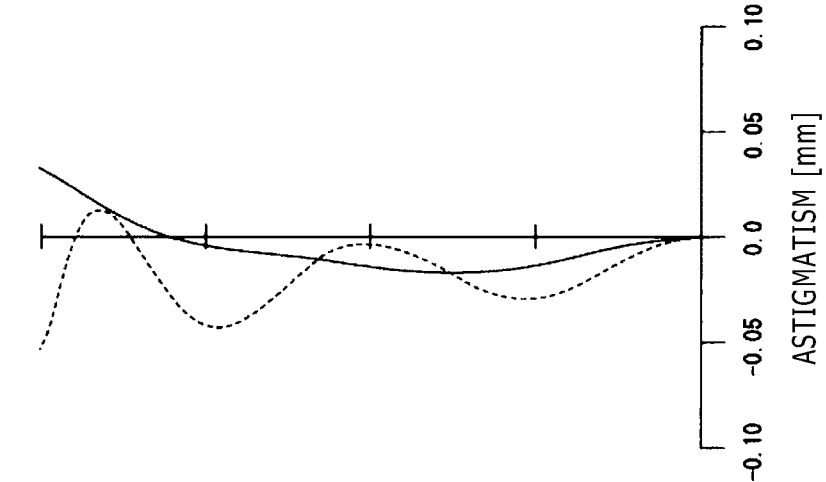
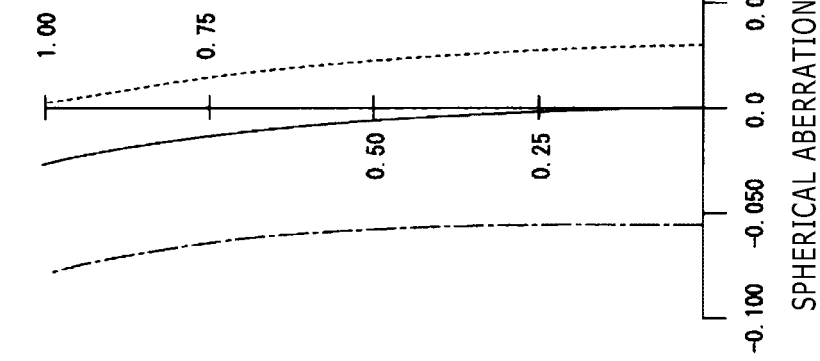

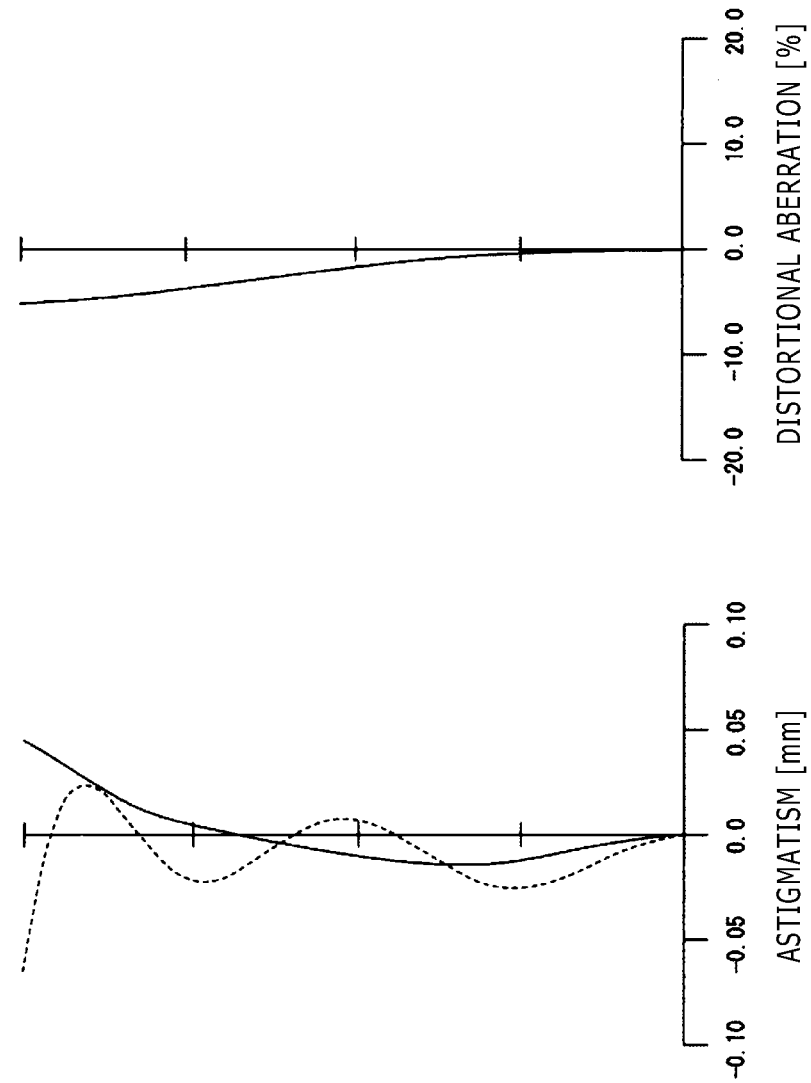
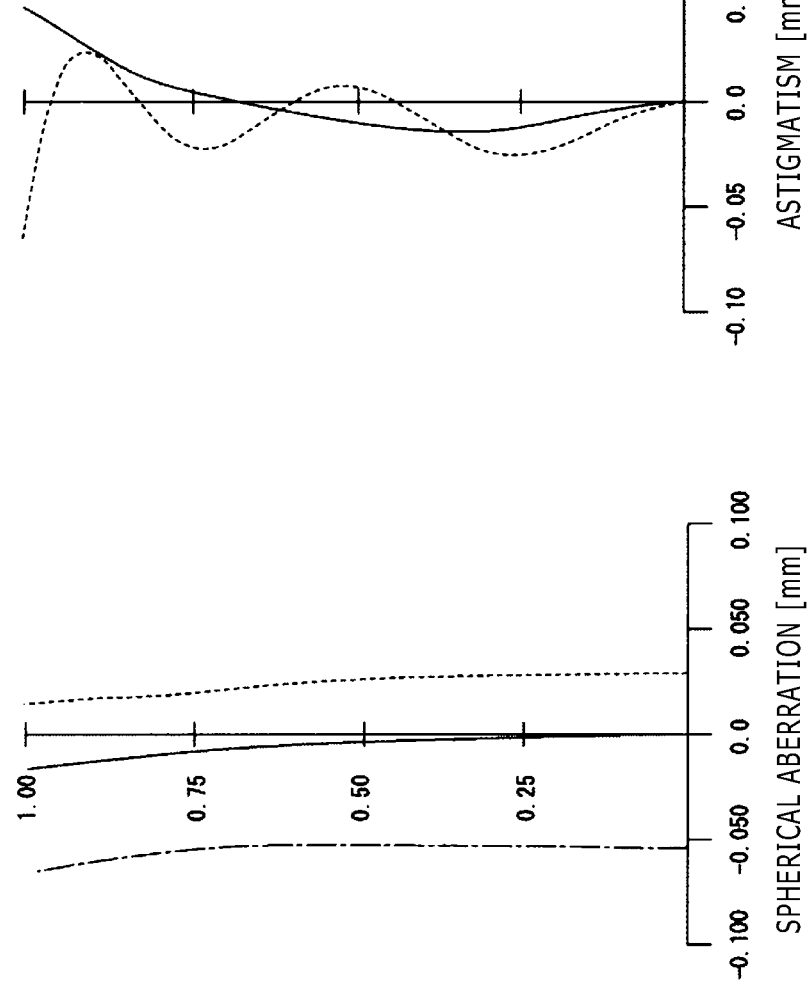
FIG.14

INTERMEDIATE(AT HIGH TEMPERATURE(60°C))

FIG.17
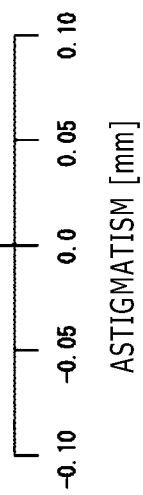
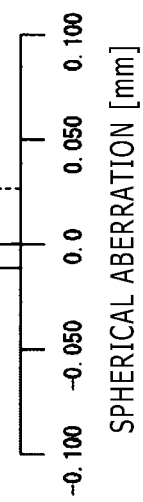

FIG.23
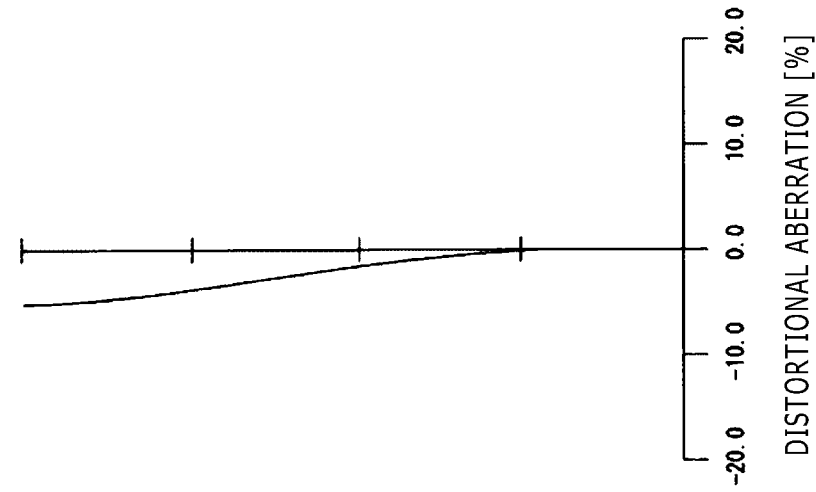
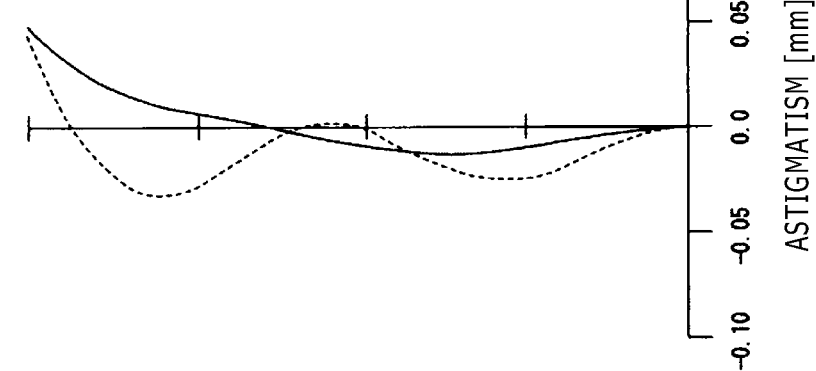
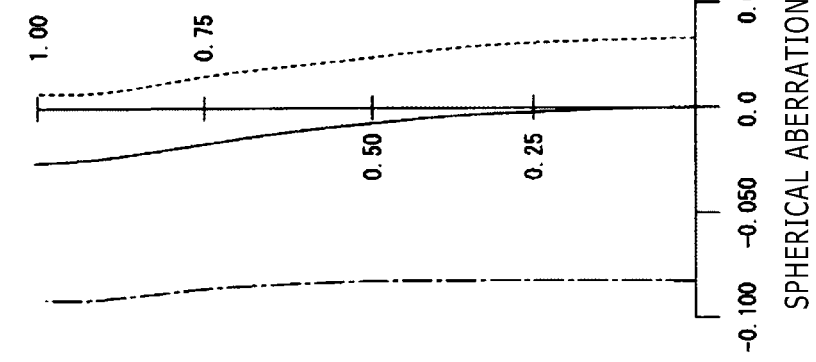
WIDE ANGLE END(AT HIGH TEMPERATURE(60°C))

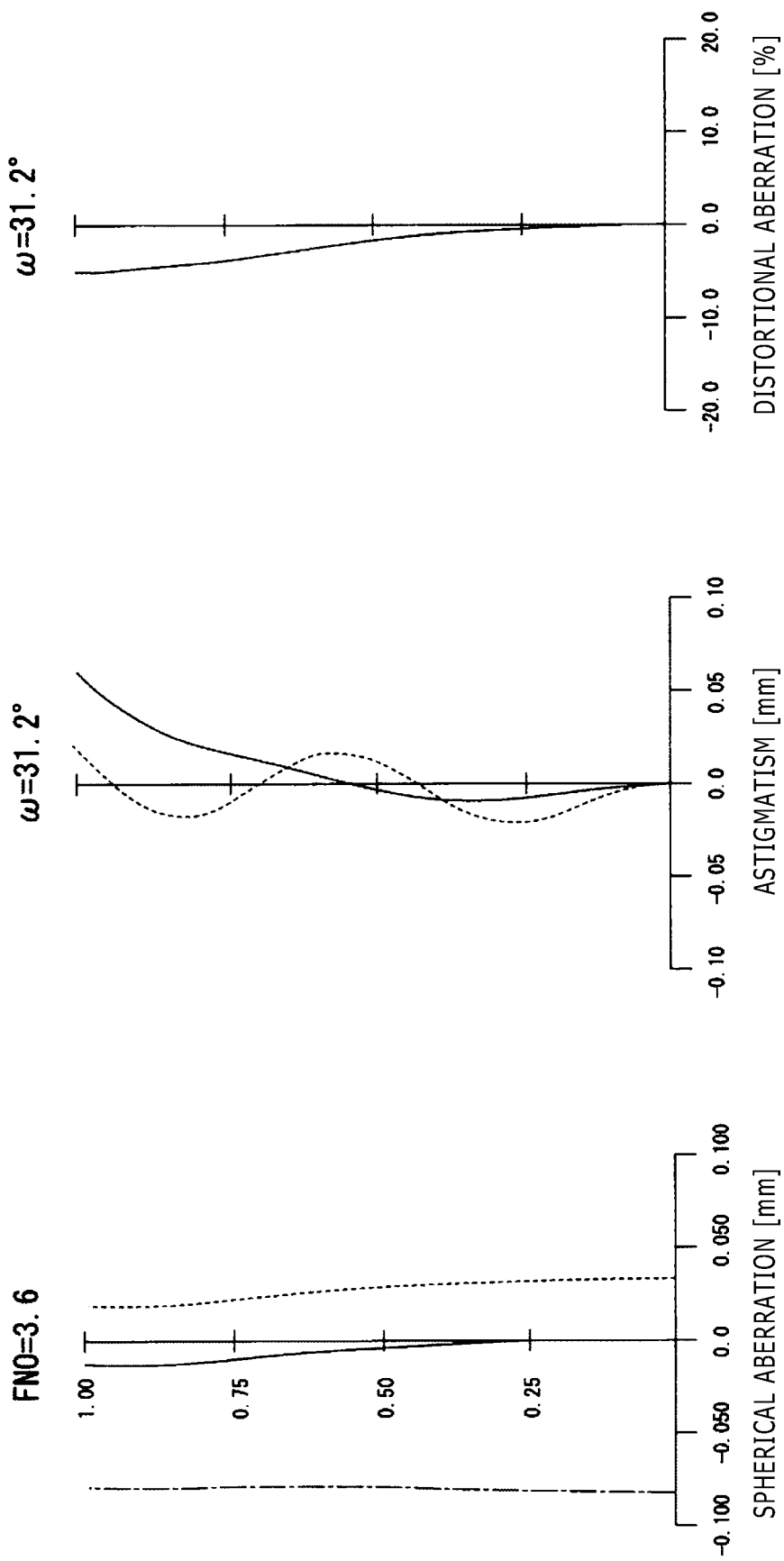

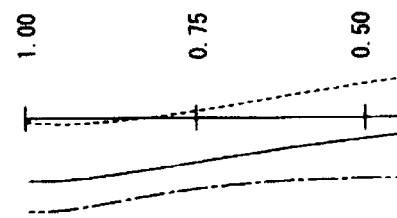
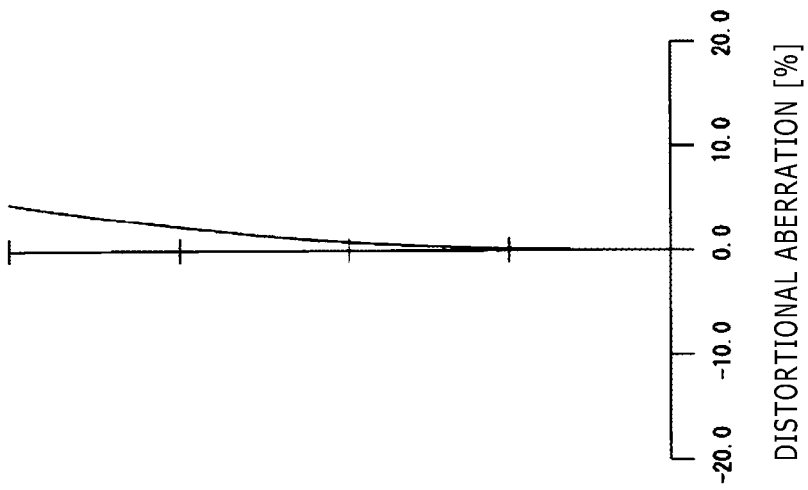
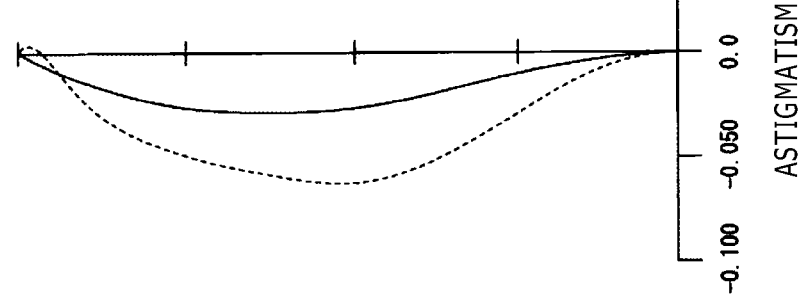

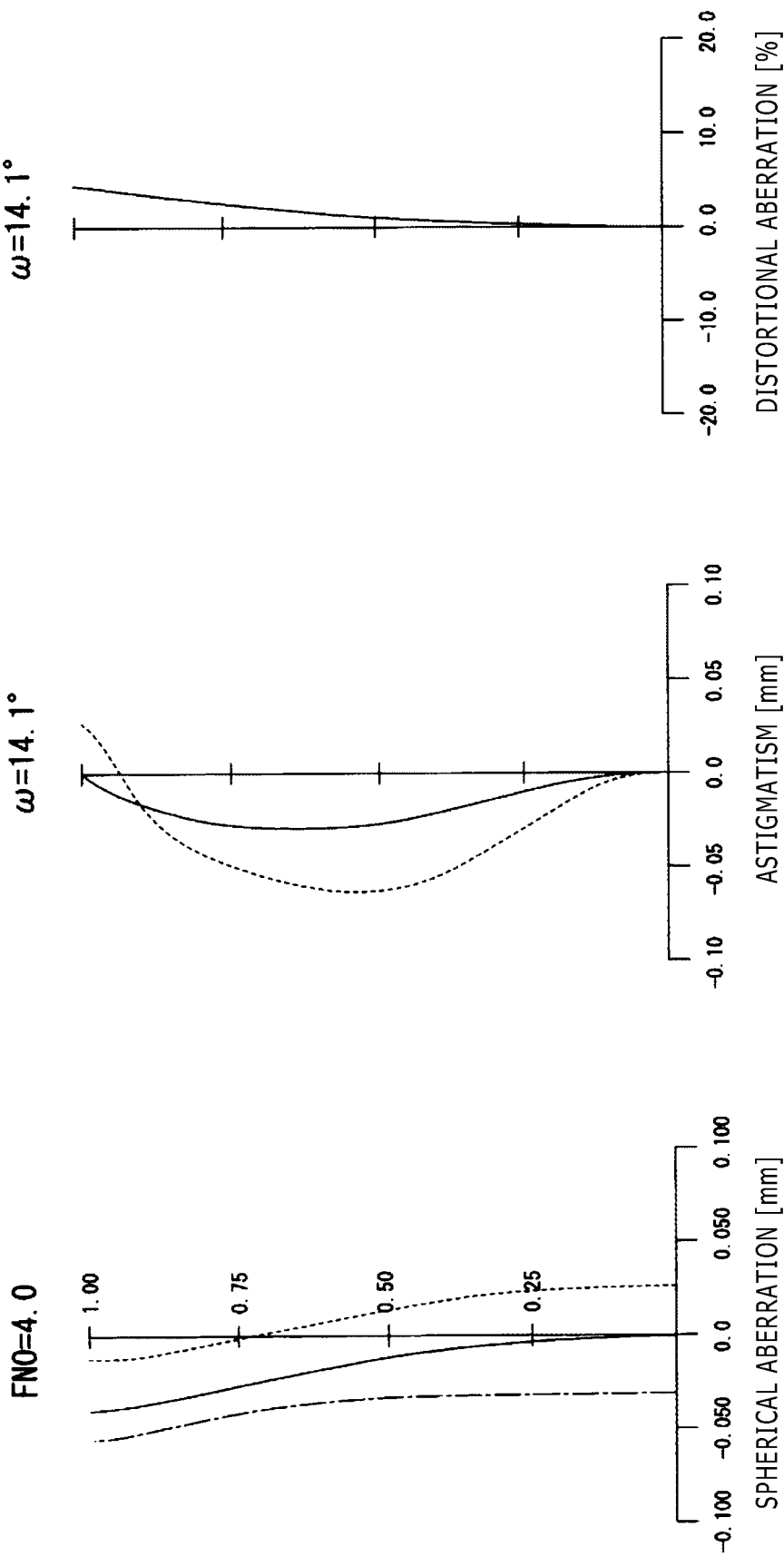

INTERMEDIATE(AT LOW TEMPERATURE(0°C))

ZOOM LENS AND IMAGE PICKUP APPARATUS

BACKGROUND

The present technology relates to a technical field of a zoom lens and an image pickup apparatus. Particularly, the present technology relates to a technical field of a zoom lens which assures a good optical performance while achieving reduction of the cost, reduction of the weight and increase of the magnification and an image pickup apparatus which includes the zoom lens.

In recent years, demands for a zoom lens for a digital still camera and a digital video camera have been and are increasing.

In particular, demands for reduction of the cost, reduction of the weight and increase of the magnification for a digital camera with an integrated lens are increasing. Further, there is a tendency that the number of pixels of an image pickup device is increasing every year, and also demands for enhancement of the picture quality are increasing.

Various types of zoom lenses have been proposed to satisfy such demands as described above and are disclosed, for example, in Japanese Patent Laid-Open No. 2004-272187 (hereinafter referred to as Patent Document 1) and Japanese Patent Laid-Open No. 2009-204942 (hereinafter referred to as Patent Document 2).

SUMMARY

However, in such optical systems as disclosed in Patent Documents 1 and 2, almost all of optical elements, namely, lenses, which configure the optical systems are made of glass material. Therefore, they have a problem in that it is difficult to achieve reduction of the cost.

Further, also it is necessary for a zoom lens to assure a good optical performance while achieving not only reduction of the cost but also reduction of the size and increase of the magnification in order to satisfy the demands in recent years.

Therefore, it is desirable to provide a zoom lens and an image pickup apparatus which overcome the problems described above and assure a good optical performance while achieving reduction of the cost, reduction of the weight and increase of the magnification.

According to a mode of the present technology, there is provided a zoom lens including a first lens group having a positive refracting power and normally positioned at a fixed position, a second lens group having a negative refracting power and movable in a direction of an optical axis for zooming, and a third lens group having a positive refracting power and normally positioned at a fixed position, the first, second and third lens groups being disposed in order from the object side to the image side, two thirds or more lenses from among a number of lenses which configure the first to third lens groups being formed from a resin material, the zoom lens satisfying the following conditional expressions (1) and (2):

$$4.0 < ft/fw \quad (1)$$

$$-100.0 < f1 \text{ to } 3/fw < -6.4 \quad (2)$$

where fw is a focal length of the entire lens system in a wide angle end state, ft a focal length of the entire lens system in a telephoto end state, and f1 to 3 a combined focal length of the first to third lens groups at all zoom positions.

In the zoom lens, degradation of a temperature characteristic such as defocusing or degradation of a resolution performance is suppressed.

Preferably, the following condition expression (3) is satisfied:

$$-1.0 < fp1/fw < 2.5 \quad (3)$$

where fp1 is a position of a front side principal point of the first lens group, representing a distance from a face on the most object side of the first lens group, wherein the distance on the image side has a positive sign.

Where the zoom lens satisfies the conditional expression (3), the angle of view at the wide angle end is great and various aberrations at the wide angle end are corrected favorably.

Preferably, a fourth lens group which has a positive refracting power and is movable in the direction of the optical axis for correction of a focal position and focusing by zooming is disposed on the image side of the third lens group.

Where the fourth lens group which has a positive refracting power and is movable in the direction of the optical axis for correction of a focal position and focusing by zooming is disposed on the image side of the third lens group, light transmitted through the first to third lens groups is condensed efficiently by the fourth lens group.

More preferably, the fourth lens group is configured from a positive lens having a positive refracting power and a negative lens having a negative refracting power, which are disposed in order from the object side to the image side, and one of the positive lens and negative lens is formed from a glass material and the other one of the lenses is formed from a resin material.

Where one of the positive lens and the negative lens is formed from a glass material and the other one of the lenses is formed from a resin material, displacement of the temperature characteristic is compensated for as a whole and aberration correction is carried out favorably.

According to another mode of the present technology, there is provided an image pickup apparatus including a zoom lens, and an image pickup device for converting an optical image formed by the zoom lens into an electric signal, the zoom lens including a first lens group having a positive refracting power and normally positioned at a fixed position, a second lens group having a negative refracting power and movable in a direction of an optical axis for zooming, and a third lens group having a positive refracting power and normally positioned at a fixed position, the first, second and third lens groups being disposed in order from the object side to the image side, two thirds or more lenses from among a number of lenses which configure the first to third lens groups being formed from a resin material, the zoom lens satisfying the following conditional expressions (1) and (2):

$$4.0 < ft/fw \quad (1)$$

$$-100.0 < f1 \text{ to } 3/fw < -6.4 \quad (2)$$

where fw is a focal length of the entire lens system in a wide angle end state, ft a focal length of the entire lens system in a telephoto end state, and f1 to 3 a combined focal length of the first to third lens groups at all zoom positions.

In the image pickup apparatus, degradation of a temperature characteristic such as defocusing or degradation of a resolution performance is suppressed.

With the zoom lens and the image pickup apparatus of the present technology, reduction of the cost, reduction of the weight and increase of the magnification are achieved and a good optical performance is assured.

The above and other features and advantages of the present technology will become apparent from the following description and the appended claims, taken in conjunction with the accompanying drawings in which like parts or elements are denoted by like reference characters.

BRIEF DESCRIPTION OF THE DRAWINGS

FIG. 13 is a similar view but illustrating a spherical aberration, an astigmatism and a distortional aberration of the zoom lens of FIG. 11 at a high temperature;

FIG. 14 is a similar view but illustrating a spherical aberration, an astigmatism and a distortional aberration of the zoom lens of FIG. 11 at a low temperature;

FIG. 17 is a similar view but illustrating a spherical aberration, an astigmatism and a distortional aberration of the zoom lens of FIG. 11 at a low temperature;

FIG. 23 is a similar view but illustrating a spherical aberration, an astigmatism and a distortional aberration of the zoom lens of FIG. 21 at a high temperature;

FIG. 24 is a similar view but illustrating a spherical aberration, an astigmatism and a distortional aberration of the zoom lens of FIG. 21 at a low temperature;

FIG. 25 is a diagrammatic view illustrating a spherical aberration, an astigmatism and a distortional aberration in an intermediate focal length state of the zoom lens of FIG. 21 according to a numerical value example wherein particular numerical values are applied to the zoom lens together with FIGS. 26 and 27, and particularly illustrating the aberrations at a normal temperature of the zoom lens;

FIG. 26 is a similar view but illustrating a spherical aberration, an astigmatism and a distortional aberration of the zoom lens of FIG. 21 at a high temperature;

DETAILED DESCRIPTION OF THE PREFERRED EMBODIMENTS

Figure 1:
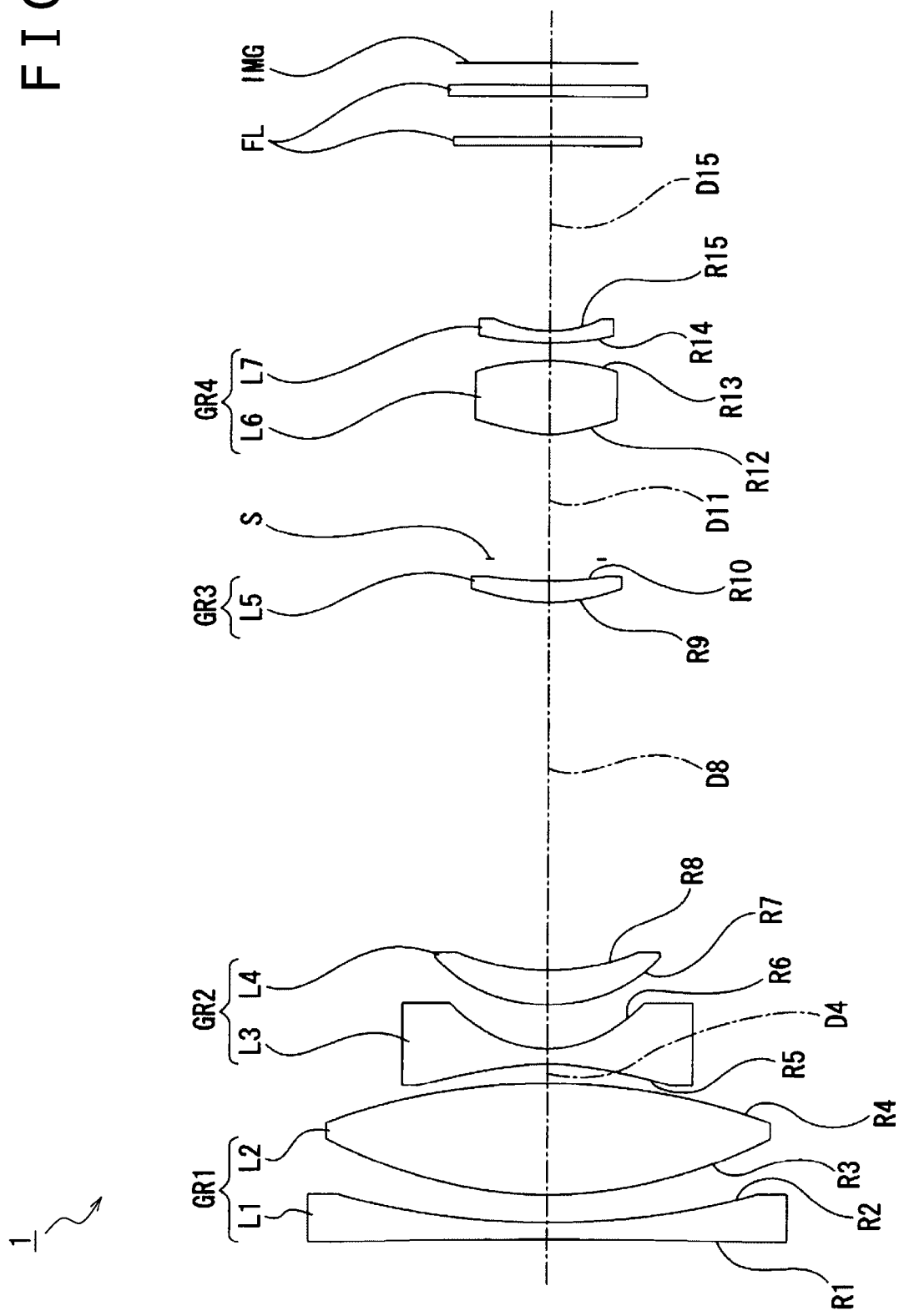
FIG. 1 is a schematic view showing a lens configuration of a zoom lens according to a first embodiment of the present technology.

In the following, a zoom lens and an image pickup apparatus according to preferred modes of the present technology are described.

Configuration of the Zoom Lens

The zoom lens of the present technology includes a first lens group having a positive refracting power and normally positioned at a fixed position, a second lens group having a negative refracting power and movable in the direction of an optical axis for zooming, and a third lens group having a positive refracting power and normally positioned at a fixed position. The first, second and third lens groups are disposed in order from the object side to the image side.

Further, in the zoom lens of the present technology, two thirds or more lenses from among a number of lenses which configure the first to third lens groups are formed from resin material, and conditional expressions (1) and (2) given below are satisfied:

$$4.0 < ft/fw \qquad (1)$$

$$-100.0 < f1 \text{ to } 3/fw < -6.4 \qquad (2)$$

where fw is the focal length of the entire lens system in a wide angle end state, ft is the focal length of the entire lens system in a telephoto end state, and f1 to 3 is the combined focal length of the first to third lens groups (at all zoom positions).

In the zoom lens of the present technology, two thirds or more lenses from among the number of lenses which configure the first to third lens groups are formed from resin material as described above. Consequently, reduction of the cost and reduction of the weight can be anticipated.

The conditional expression (1) defines a magnification, and the conditional expression (2) defines a ratio between the combined focal length of the first to third lens groups and the focal length of the entire lens system at a wide angle end.

Where many lenses are formed from a resin material having a refractive index which exhibits a great variation in response to the temperature variation as described above, there is the possibility that defocusing upon temperature variation and degradation of the resolution performance by such defocusing may occur. Particularly with a zoom lens which achieves an enhanced magnification as represented by the conditional expression (1), defocusing upon temperature variation and degradation of the resolution performance by such defocusing are likely to occur at all zoom positions.

Therefore, with the zoom lens of the present technology, an increased magnification is achieved in accordance with the conditional expression (1), and besides defocusing and degradation of the resolution performance described above are suppressed in accordance with the conditional expression (2).

In particular, if the combined focal length of the first to third lens groups becomes smaller exceeding the lower limit of the conditional expression (2), then also the variation amount of the refractive index upon temperature variation increases together. Consequently, it becomes difficult to suppress the degradation of the temperature characteristic such as defocusing and degradation of the resolution performance which occurs at this time. Further, if the ratio described hereinabove does not fall within the range of the conditional expression (2) at all zoom positions, then it is difficult to compensate for the optical performance at all zoom positions.

Accordingly, if the zoom lens satisfies the conditional expressions (1) and (2), then a good optical performance can be assured while an increased magnification is achieved.

It is to be noted that the zoom lens more preferably satisfies the following conditional expression (2)':

$$-50.0 < f1 \text{ to } 3/fw < -8.0 \qquad (2)'$$

Where the zoom lens satisfies the conditional expression (2)', defocusing and degradation of the resolution performance can be suppressed further.

The zoom lens according to one form of the present technology preferably satisfies the following conditional expression (3):

$$-1.0 < fp1/fw < 2.5 \qquad (3)$$

where fp1 is the position of the front side principal point of the first lens group, namely, the distance from the face on the most object side of the first lens group, wherein the distance on the image side has a positive sign.

The conditional expression (3) defines a ratio between the position of the front side principal point of the first lens group and the focal length of the entire lens system at the wide angle end.

If the front side principal point of the first lens group is positioned on the object side exceeding the lower limit of the conditional expression (3), then the angle of view at the wide angle end is limited and the convenience in use degrades.

On the contrary, if the front side principal point of the first lens group is positioned on the object side exceeding the upper limit of the conditional expression (3), then in the case where the first lens group is formed from a resin material which is limited in refractive index or variance, it is difficult to correct the various aberrations as the wide angle end.

Accordingly, in the case where the zoom lens satisfies the conditional expression (3), improvement of the optical performance by increase of the angle of view and good correction of the aberrations at the wise angle end can be achieved.

It is to be noted that the zoom lens more preferably satisfies the following conditional expression (3)':

$$0.0 < fp1/fw < 1.5 \qquad (3)'$$

If the zoom lens satisfies the conditional expression (3)', then further enhancement of the optical performance by increase of the angle of view and good correction of the aberrations at the wise angle end can be achieved.

Preferably, in the zoom lens according to the form of the present technology, a fourth lens group having a positive refracting power and movable in the direction of an optical axis for correction of the focal position and focusing by zooming is disposed on the image side of the third lens group.

As the fourth lens group which has a positive refracting power and carries out focusing is disposed, a light beam transmitted through the first to third lens groups with the conditional expression (2) satisfied is emitted in a state substantially proximately to an afocal state and condensed efficiently by the fourth lens group. Accordingly, aberration correction can be carried out efficiently over the overall zoom region, and an effective optical performance can be assured against distance variation.

Preferably, in the zoom lens according to the form of the present technology, the fourth lens group is configured from a positive lens having a positive refracting power and a negative lens having a negative refracting power, disposed in order from the object side to the image side, and one of the positive lens and the negative lens is formed from glass material while the other is formed from resin material.

As the fourth lens group is configured from a positive lens and a negative lens disposed in order from the object side to the image side in this manner, reduction of the overall length of the optical system can be anticipated.

Further, since one of the lenses of the fourth lens group which has a positive refracting power is formed from a resin material which exhibits a great displacement in temperature characteristic, it is facilitated to compensate for the displacement in temperature characteristic as a whole.

Further, by forming one of the lenses of the fourth lens group from a resin material, further reduction of the cost and the weight can be anticipated. Further, that the other lens of the fourth lens group is formed from a glass material provides an effect that this is means effective for aberration correction in the optical system wherein two thirds or more of the number of lenses which configure the first to third lens groups are formed from a resin material.

Working Examples of Numerical Values of the Zoom Lens

In the following, particular embodiments of the zoom lens of the present technology and several examples of numerical values wherein particular numerical values are applied to the zoom lens of the embodiments are described with reference to the accompanying drawings and tables.

It is to be noted that the symbols used in the tables and the following description have the following meanings and so forth.

"Face number" is a face number of the ith face as counted from the object side toward the image side; "Ri" the paraxial radius of curvature of the ith face; "Di" the on-axis face distance between the ith face and the i+1th face, namely the thickness of the center or the air distance of the lens; "Ni" the refractive index at the d-line ($\lambda$=587.6 nm) of the lens or the like beginning with the ith face; and "vi" the Abbe number at the d-line of the lens or the like beginning with the ith face.

"Aspheric" of the "Face number" represents that the face is an aspheric face; "∞" of "Ri" represents that the face is a flat face; and "Variable" of "Di" represents that the on-axis face distance is a variable distance.

"$\kappa$" is the conic constant, and "A4," "A6," "A8" and "A10" are the fourth, sixth, eighth and tenth order aspheric coefficients.

"f" is the focal length; "FNO" the F number; and "$\omega$" the half angle of view.

It is to be noted that, in the tables given below in which the aspheric constant is included, "E-n" represents an exponential notation to the base 10, namely "$10^{-n}$," and for example, "0.12345E-05" represents "0.12345×$10^{-5}$."

The zoom lenses used in the embodiments include an aspheric lens face. Where "x" is the distance or sag amount in the direction of the optical axis from the vertex of the lens face; "y" the height, namely, the image height, in a direction perpendicular to the direction of the optical axis; "c" the paraxial radius of curvature at the vertex of the lens, namely, a reciprocal number to the radius of curvature; "$\kappa$" the conic constant; and "A4," "A6," "A8" and "A10" are the fourth, sixth, eighth and tenth aspheric constants, respectively, the aspheric face shape is defined by the following expression 1:

$$x = \frac{cy^2}{1+\{1-(1+\kappa)c^2 y^2\}^{1/2}} + A4y^4 + A6y^6 + A8y^8 + A10y^{10} \quad \text{Expression 1}$$

First Embodiment

FIG. 1 shows a lens configuration of a zoom lens 1 according to a first embodiment of the present technology.

Referring to FIG. 1, the zoom lens 1 includes a first lens group GR1 having a positive refracting power, a second lens group GR2 having a negative refracting power, a third lens group GR3 having a positive refracting power, and a fourth lens group GR4 having a positive refracting power. The first lens group GR1, second lens group GR2, third lens group GR3 and fourth lens group GR4 are disposed in order from the object side to the image side.

The first lens group GR1 is normally positioned at a fixed position, and the second lens group GR2 is movable in a direction of an optical axis for zooming. The third lens group GR3 is normally positioned at a fixed position, and the fourth lens group GR4 is movable in a direction of the optical axis for correction of the focal position by zooming and for focusing.

The zoom lens 1 has a zoom ratio set to 4.80 times.

The first lens group GR1 is configured from two lenses including a negative lens L1 and a positive lens L2 disposed in order from the object side to the image side.

The second lens group GR2 is configured from two lenses including a negative lens L3 and a positive lens L4 disposed in order from the object side to the image side.

The third lens group GR3 is configured from one lens, namely, a positive lens L5.

The fourth lens group GR4 is configured from two lenses including a positive lens L6 and a negative lens L7 disposed in order from the object side to the image side.

A filter FL is disposed between the fourth lens group GR4 and an image plane IMG. An aperture stop S is disposed in the proximity of the third lens group GR3 on the object side.

In the zoom lens 1, the negative lens L1 and the positive lens L2 of the first lens group GR1, the negative lens L3 and the positive lens L4 of the second lens group GR2, the positive lens L5 of the third lens group GR3 and the negative lens L7 of the fourth lens group GR4 are formed from a resin material. Meanwhile, the positive lens L6 of the fourth lens group GR4 is formed from a glass material.

Accordingly, in the zoom lens 1, all of the totaling five lenses of the first to third lens groups GR1 to GR3 are formed from a resin material.

Table 1 indicates lens data of the numerical value example 1 wherein particular numerical values are applied to the zoom lens 1 according to the first embodiment.

TABLE 1

| Si | Ri | Di | Ni | vi |
|---|---|---|---|---|
| 1(ASP) | −219.982 | 0.800 | 1.635 | 23.868 |
| 2(ASP) | 37.795 | 1.261 | | |
| 3(ASP) | 19.107 | 4.963 | 1.531 | 55.907 |
| 4(ASP) | −26.558 | 0.938 | | |
| 5(ASP) | −11.325 | 0.700 | 1.531 | 55.907 |
| 6(ASP) | 5.380 | 2.029 | | |
| 7(ASP) | 7.678 | 1.554 | 1.635 | 23.868 |
| 8(ASP) | 12.601 | 16.490 | | |
| 9(ASP) | 9.267 | 0.952 | 1.531 | 55.907 |
| 10(ASP) | 18.326 | 1.000 | | |
| 11(Aperture stop) | ∞ | 5.603 | | |
| 12(ASP) | 7.099 | 3.300 | 1.497 | 81.558 |
| 13(ASP) | −12.474 | 0.801 | | |
| 14(ASP) | 11.525 | 0.550 | 1.635 | 23.868 |
| 15 | 5.469 | 8.35 | | |
| 16 | ∞ | 0.380 | 1.552 | 63.423 |
| 17 | ∞ | 1.840 | | |
| 18 | ∞ | 0.500 | 1.517 | 64.197 |
| 19 | ∞ | 0.990 | | |
| IMG | ∞ | 0 | | |

In the zoom lens 1, the opposite faces of the negative lens L1 of the first lens group GR1, namely, the first and second faces, the opposite faces of the positive lens L2 of the first lens group GR1, namely, the third and fourth faces, the opposite faces of the negative lens L3 of the second lens group GR2, namely, the fifth and sixth faces, the opposite faces of the positive lens L4 of the second lens group GR2, namely, the seventh and eighth faces, the opposite faces of the positive lens L5 of the third lens group GR3, namely, the ninth and tenth faces, the opposite faces of the positive lens L6 of the fourth lens group GR4, namely, the twelfth and thirteenth faces, and the face on the object side of the negative lens L7 of the fourth lens group GR4, namely, the fourteenth face, are formed as aspheric faces. The fourth, sixth, eighth and tenth order aspheric coefficients A4, A6, A8 and A10 of the aspheric faces in the numerical value example 1 are indicated in Table 2 together with the conic constant κ.

TABLE 2

|  | κ | A4 | A6 | A8 | A10 |
|---|---|---|---|---|---|
| 1(ASP) | 0 | −1.440E−05 | 5.013E−07 | −2.225E−09 | 0.000E+00 |
| 2(ASP) | 0 | 2.044E−06 | 5.850E−08 | 1.151E−09 | 0.000E+00 |
| 3(ASP) | 0 | 2.979E−05 | −6.969E−07 | 1.838E−09 | 0.000E+00 |
| 4(ASP) | 0 | 6.923E−05 | −5.377E−07 | 5.925E−10 | 0.000E+00 |
| 5(ASP) | 0 | 5.618E−04 | −1.519E−06 | 0.000E+00 | 0.000E+00 |
| 6(ASP) | 0 | −7.828E−04 | 3.872E−05 | −1.260E−06 | 3.542E−08 |
| 7(ASP) | 0 | −1.555E−04 | 3.110E−05 | −3.740E−07 | 0.000E+00 |
| 8(ASP) | 0 | 1.326E−04 | 2.375E−05 | −7.142E−07 | 0.000E+00 |
| 9(ASP) | 0 | −4.383E−05 | −6.224E−06 | 8.500E−07 | −1.011E−07 |
| 10(ASP) | 0 | 7.456E−05 | 3.269E−06 | 0.000E+00 | 0.000E+00 |
| 12(ASP) | 0 | −6.613E−04 | −2.338E−05 | −4.589E−07 | 7.087E−08 |
| 13(ASP) | 0 | −1.079E−03 | 3.018E−05 | 0.000E+00 | 0.000E+00 |
| 14(ASP) | 0 | −1.240E−03 | 2.902E−05 | 6.100E−07 | 0.000E+00 |

In the zoom lens 1, upon zooming between the wide angle end state and the telephoto end state, the face distance D4 between the first lens group GR1 and the second lens group GR2, the face distance D8 between the second lens group GR2 and the third lens group GR3, the face distance D11 between the aperture stop S and the fourth lens group GR4 and the face distance D15 between the fourth lens group GR4 and the filter FL vary. The variable distances in the wide angle end state, an intermediate focal length state and the telephoto end state among the face distances in the numerical value example 1 are indicated in Table 3 together with the focal length f, F number FNO and half angle ω of view.

TABLE 3

|  | Wide angle end | Intermediate | Telephoto end |
|---|---|---|---|
| f | 6.700 | 14.679 | 32.156 |
| FNO | 3.600 | 4.000 | 4.120 |
| ω | 31.238 | 14.044 | 6.556 |
| D4 | 0.938 | 9.584 | 16.536 |
| D8 | 16.49 | 7.84 | 0.89 |
| D11 | 5.603 | 3.215 | 1.438 |
| D15 | 8.35 | 10.74 | 12.52 |

FIGS. 2 to 10 illustrate various aberrations in an infinitely remotely focused state in the numerical value example 1.

Figure 2:
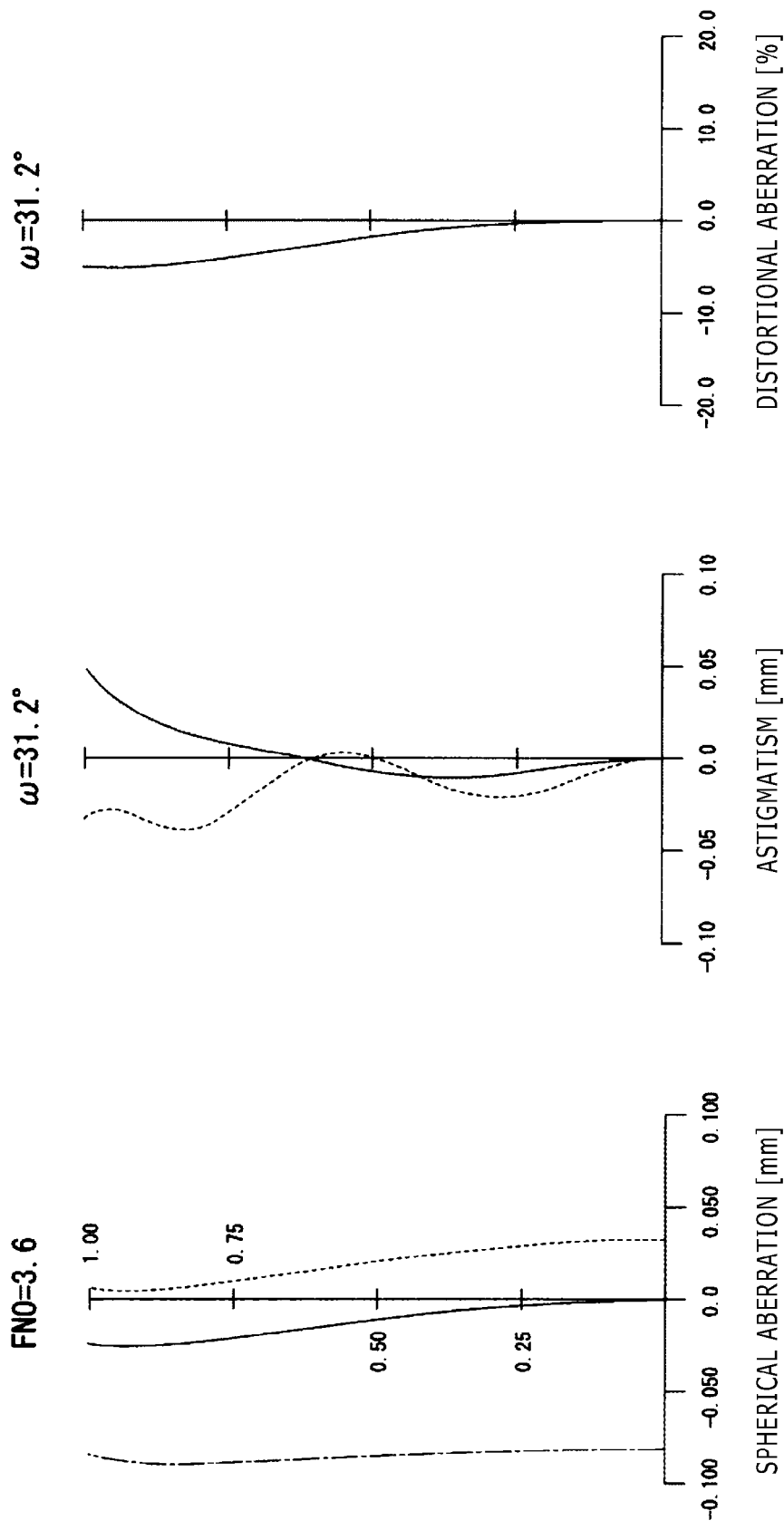
FIG. 2 is a diagrammatic view illustrating a spherical aberration, an astigmatism and a distortional aberration in a wide angle end state of the zoom lens of FIG. 1 according to a numerical value example wherein particular numerical values are applied to the zoom lens together with FIGS. 3 and 4, and particularly illustrating the aberrations at a normal temperature of the zoom lens.
Figure 3:
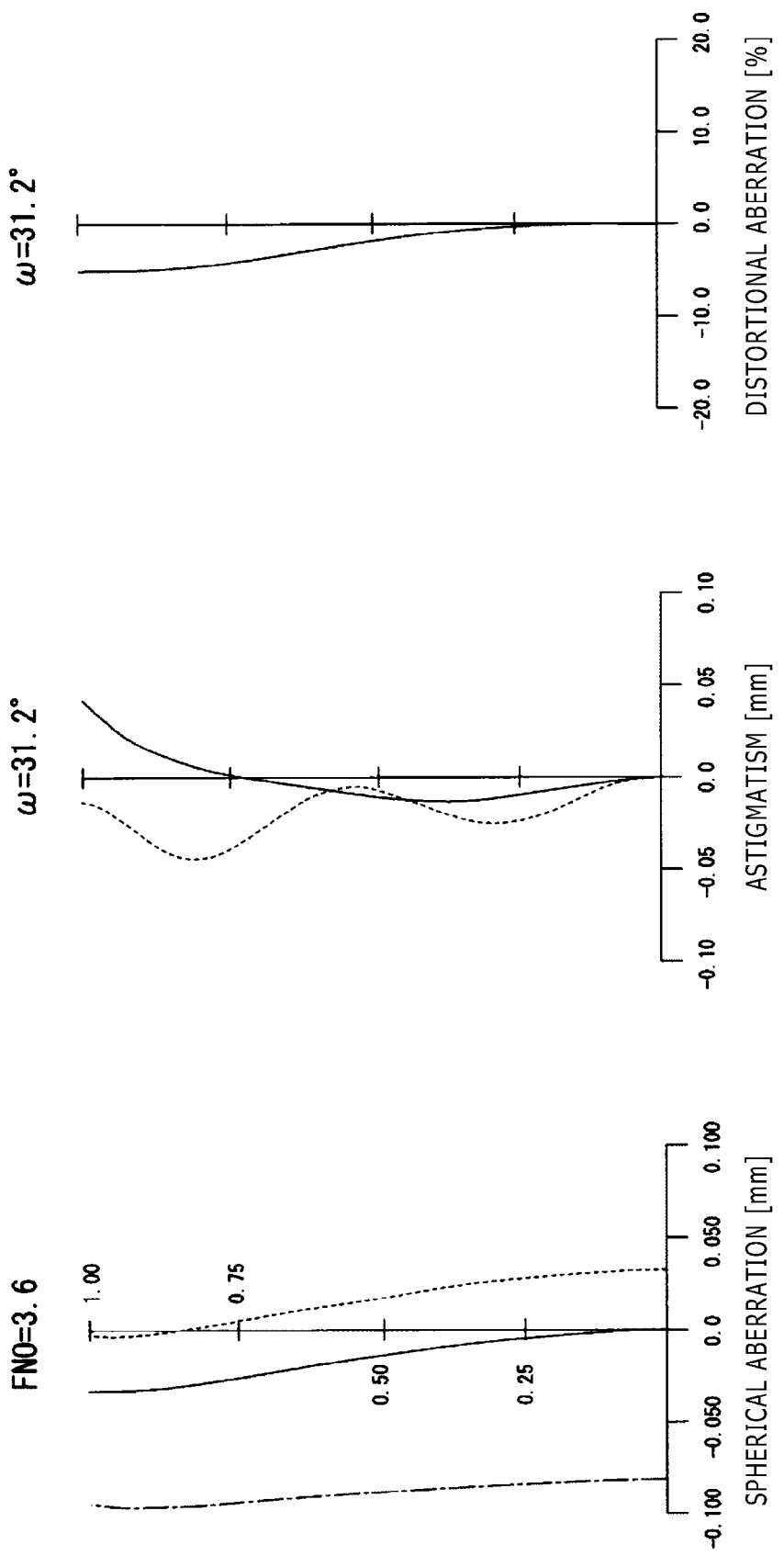
FIG. 3 is a similar view but illustrating a spherical aberration, an astigmatism and a distortional aberration of the zoom lens of FIG. 1 at a high temperature.
Figure 4:
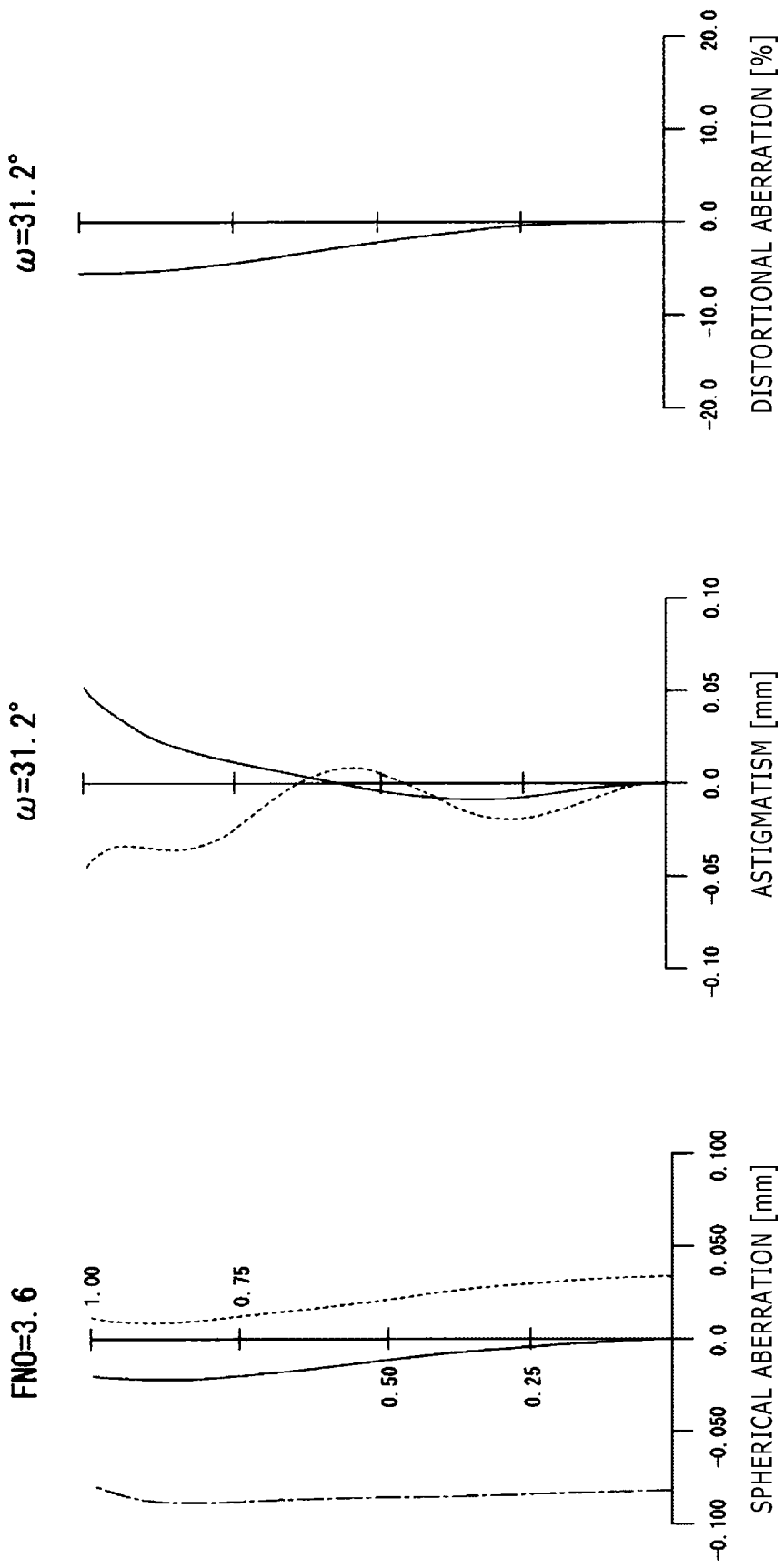
FIG. 4 is a similar view but illustrating a spherical aberration, an astigmatism and a distortional aberration of the zoom lens of FIG. 1 at a low temperature.

Particularly, FIG. 2 illustrates various aberrations at 25° C., namely, at a normal temperature, in the wide angle end state; FIG. 3 illustrates various aberrations at 60° C., namely, at a high temperature, in the wide angle end state; and FIG. 4 illustrates various aberrations at 0° C., namely, at a low temperature, in the wide angle end state.

Figure 5:
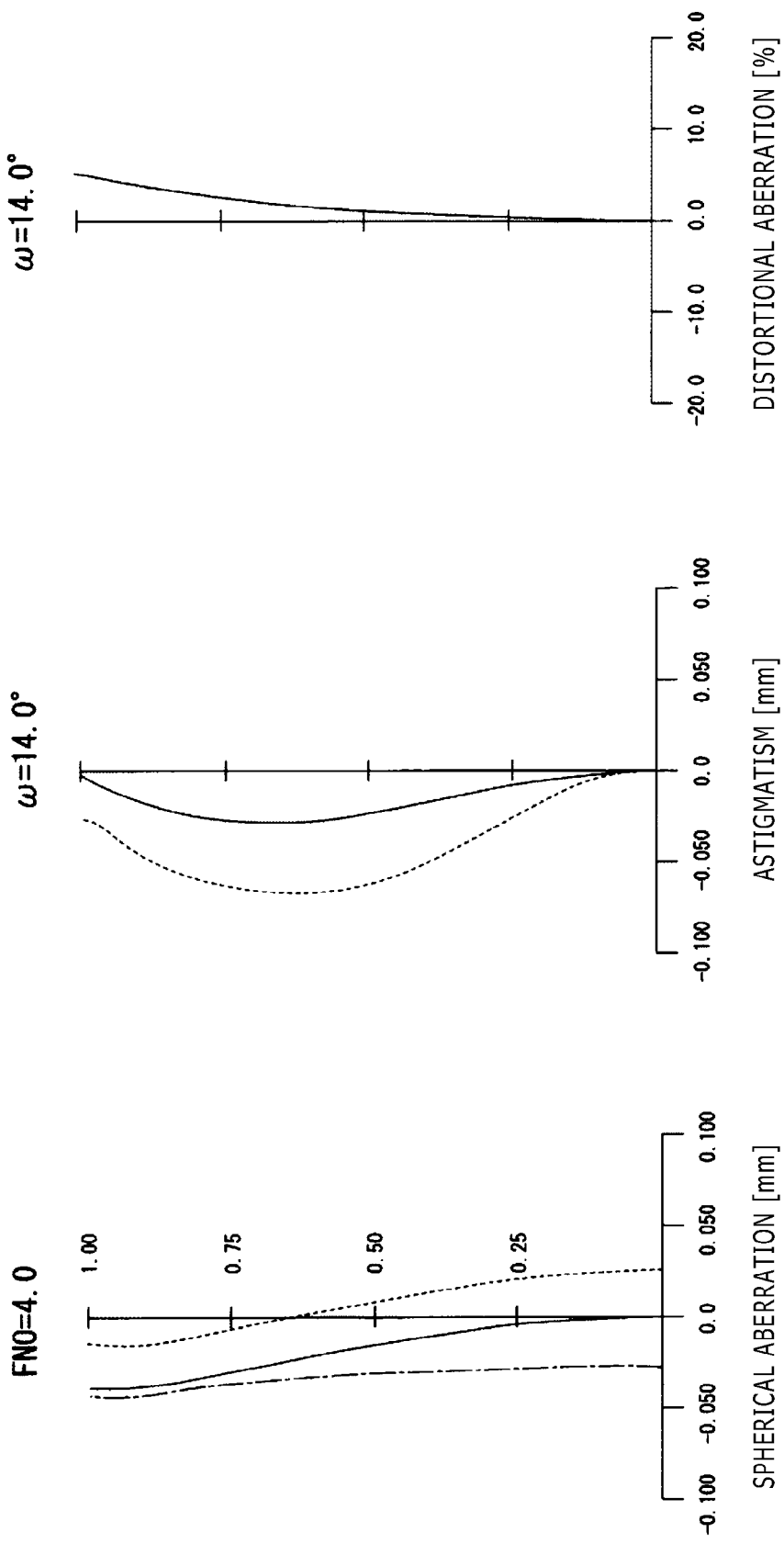
FIG. 5 is a diagrammatic view illustrating a spherical aberration, an astigmatism and a distortional aberration in an intermediate focal length state of the zoom lens of FIG. 1 according to a numerical value example wherein particular numerical values are applied to the zoom lens together with FIGS. 6 and 7, and particularly illustrating the aberrations at a normal temperature of the zoom lens.
Figure 6:
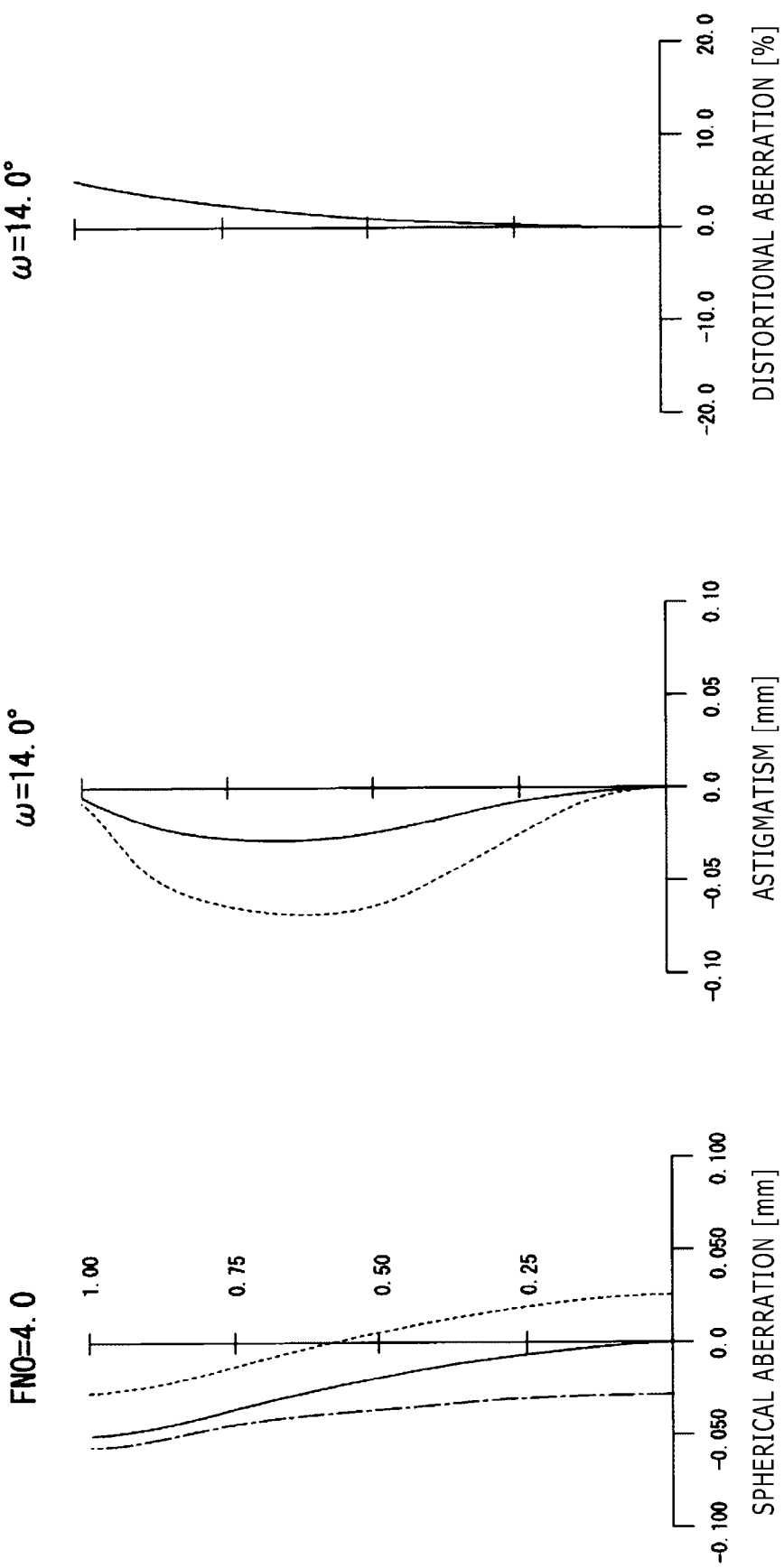
FIG. 6 is a similar view but illustrating a spherical aberration, an astigmatism and a distortional aberration of the zoom lens of FIG. 1 at a high temperature.
Figure 7:
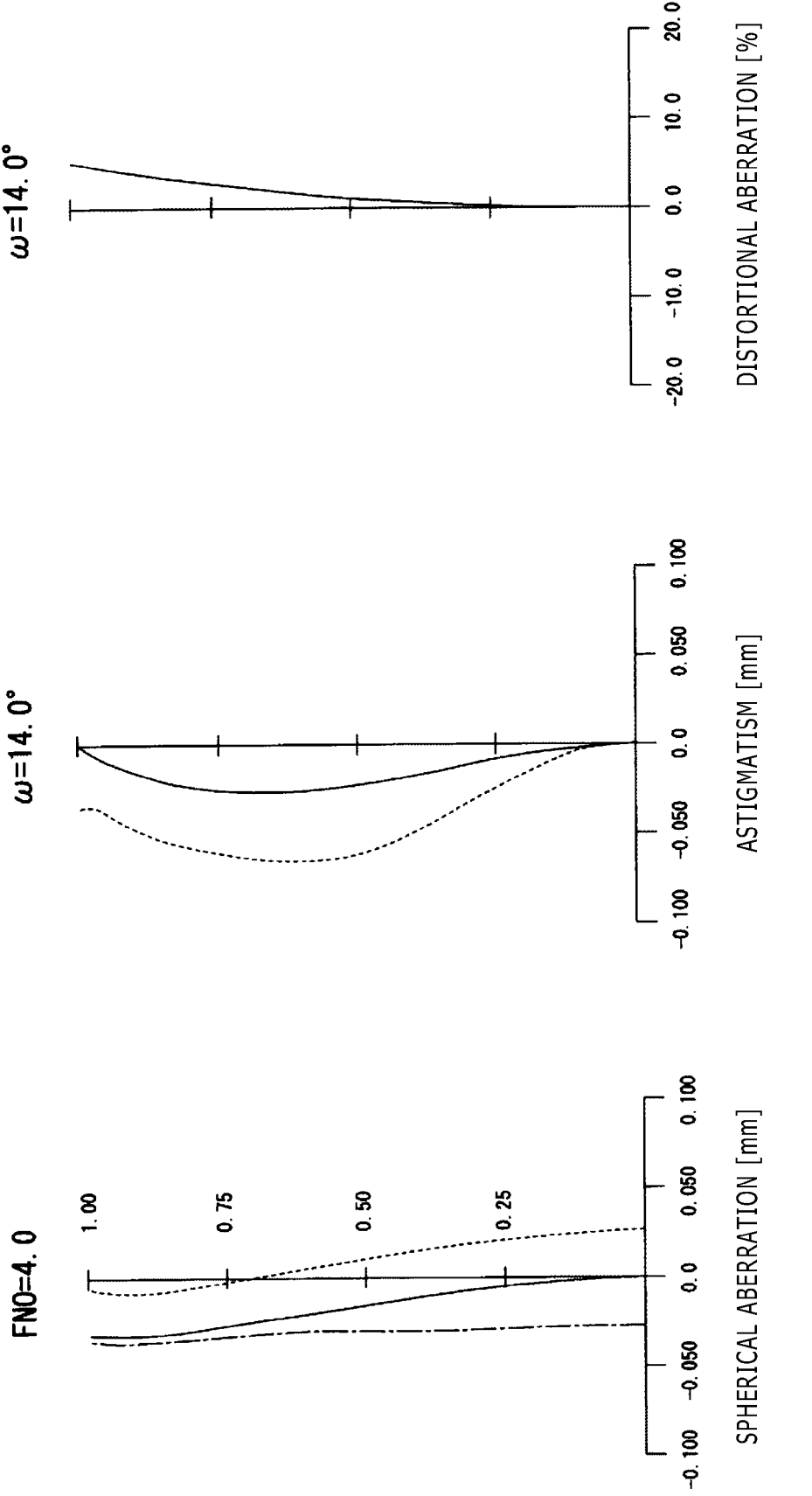
FIG. 7 is a similar view but illustrating a spherical aberration, an astigmatism and a distortional aberration of the zoom lens of FIG. 1 at a low temperature.

FIG. 5 illustrates various aberrations at 25° C., namely, at a normal temperature, in an intermediate focal length state; FIG. 6 illustrates various aberrations at 60° C., namely, at a high temperature, in the intermediate focal length state; and FIG. 7 illustrates various aberrations at 0° C., namely, at a low temperature, in the intermediate focal length state.

Figure 8:
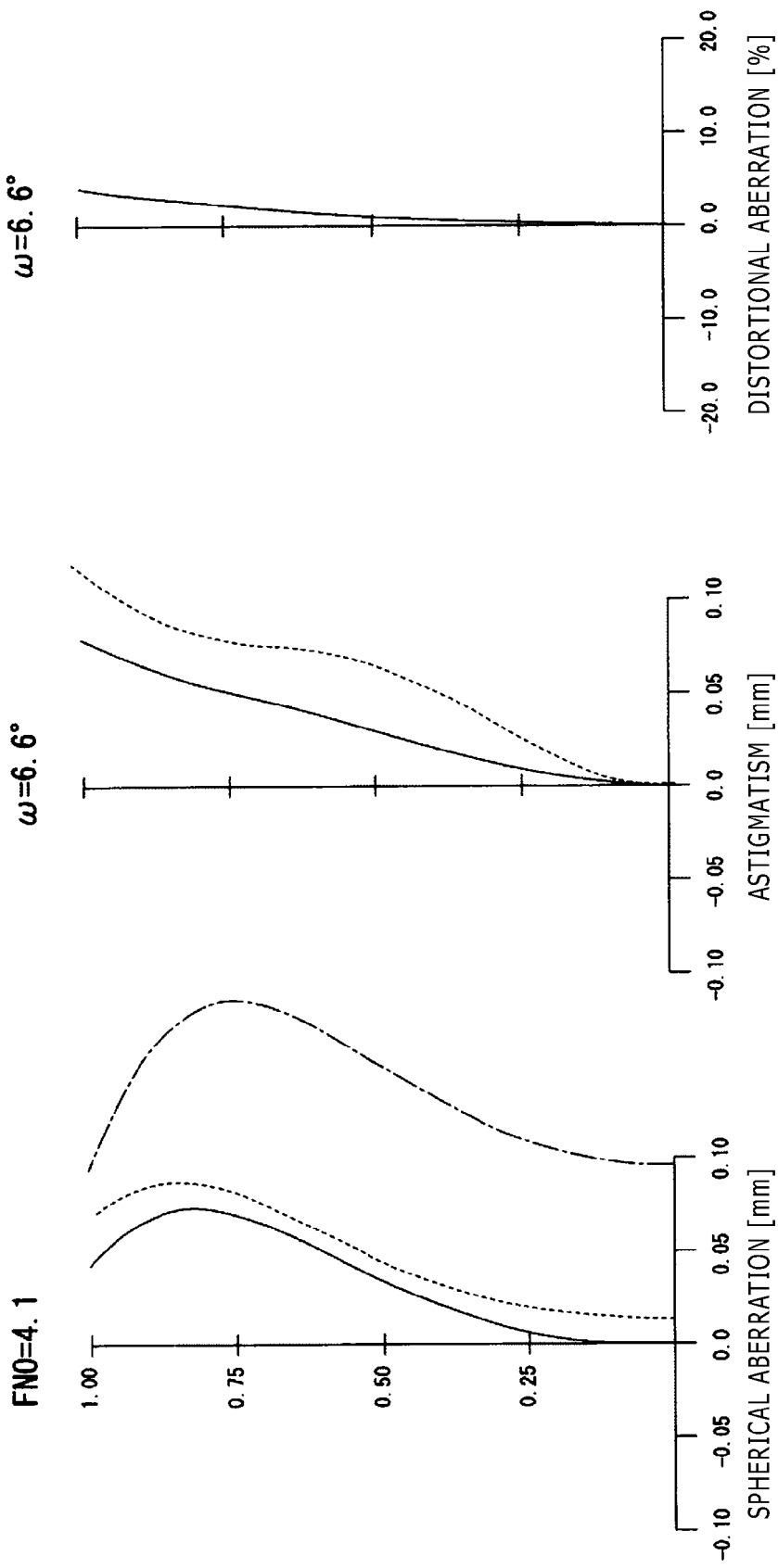
FIG. 8 is a diagrammatic view illustrating a spherical aberration, an astigmatism and a distortional aberration in a telephoto end state of the zoom lens of FIG. 1 according to a numerical value example wherein particular numerical values are applied to the zoom lens together with FIGS. 9 and 10, and particularly illustrating the aberrations at a normal temperature of the zoom lens.
Figure 9:
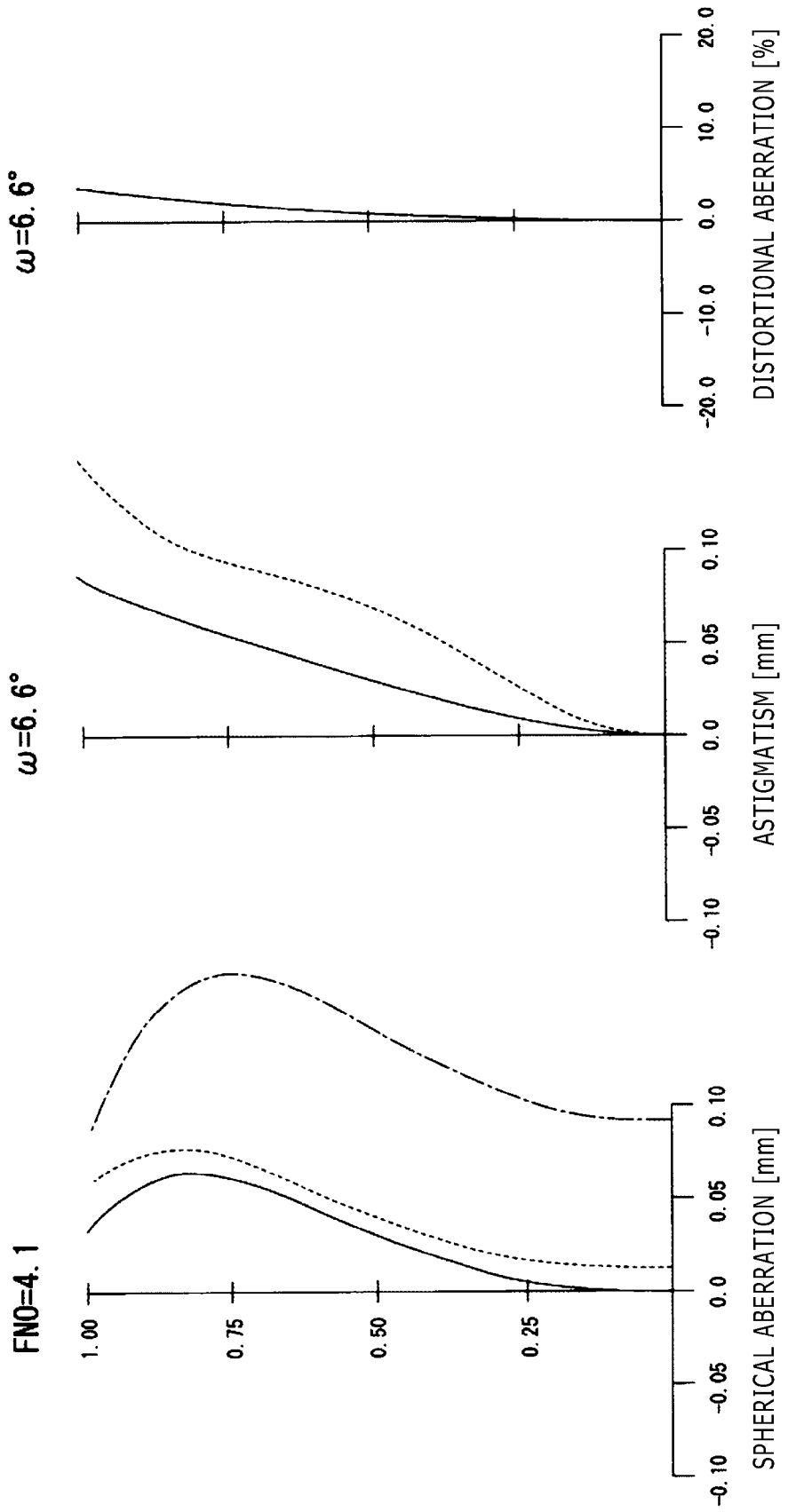
FIG. 9 is a similar view but illustrating a spherical aberration, an astigmatism and a distortional aberration of the zoom lens of FIG. 1 at a high temperature.
Figure 10:
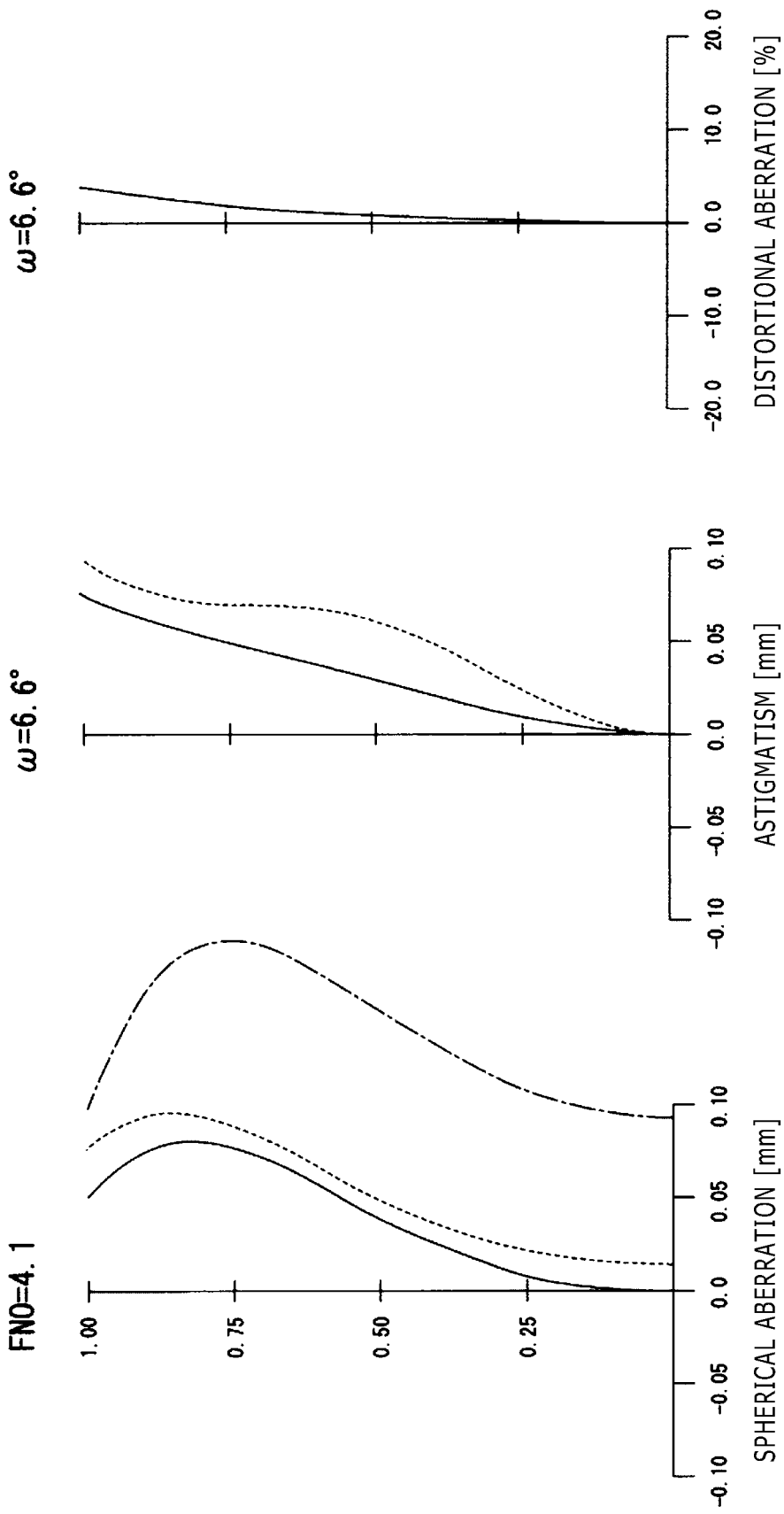
FIG. 10 is a similar view but illustrating a spherical aberration, an astigmatism and a distortional aberration of the zoom lens of FIG. 1 at a low temperature.

FIG. 8 illustrates various aberrations at 25° C., namely, at a normal temperature, in the telephoto end state; FIG. 9 illustrates various aberrations at 60° C., namely, at a high temperature, in the telephoto end state; and FIG. 10 illustrates various aberrations at 0° C., namely, at a low temperature, in the telephoto end state.

In the spherical aberration diagrams of FIGS. 2 to 10, a solid line curve indicates values on the d line (wavelength: 587.56 nm); a broken line curve indicates values on the C line (wavelength: 656.3 nm); and an alternate long and short dash line curve indicates values on the g line (wavelength: 435.8 nm). In the astigmatism diagrams, a solid line curve indicates values on the sagittal image plane of the d line; and a broken line curve indicates values on the meridional image plane of the d line. In the distortional aberration diagrams, a solid line indicates values on the d line.

From the aberration diagrams, it can be recognized apparently that the numeral value example 1 has a superior imaging performance in that the aberrations are corrected favorably.

Second Embodiment

Figure 11:
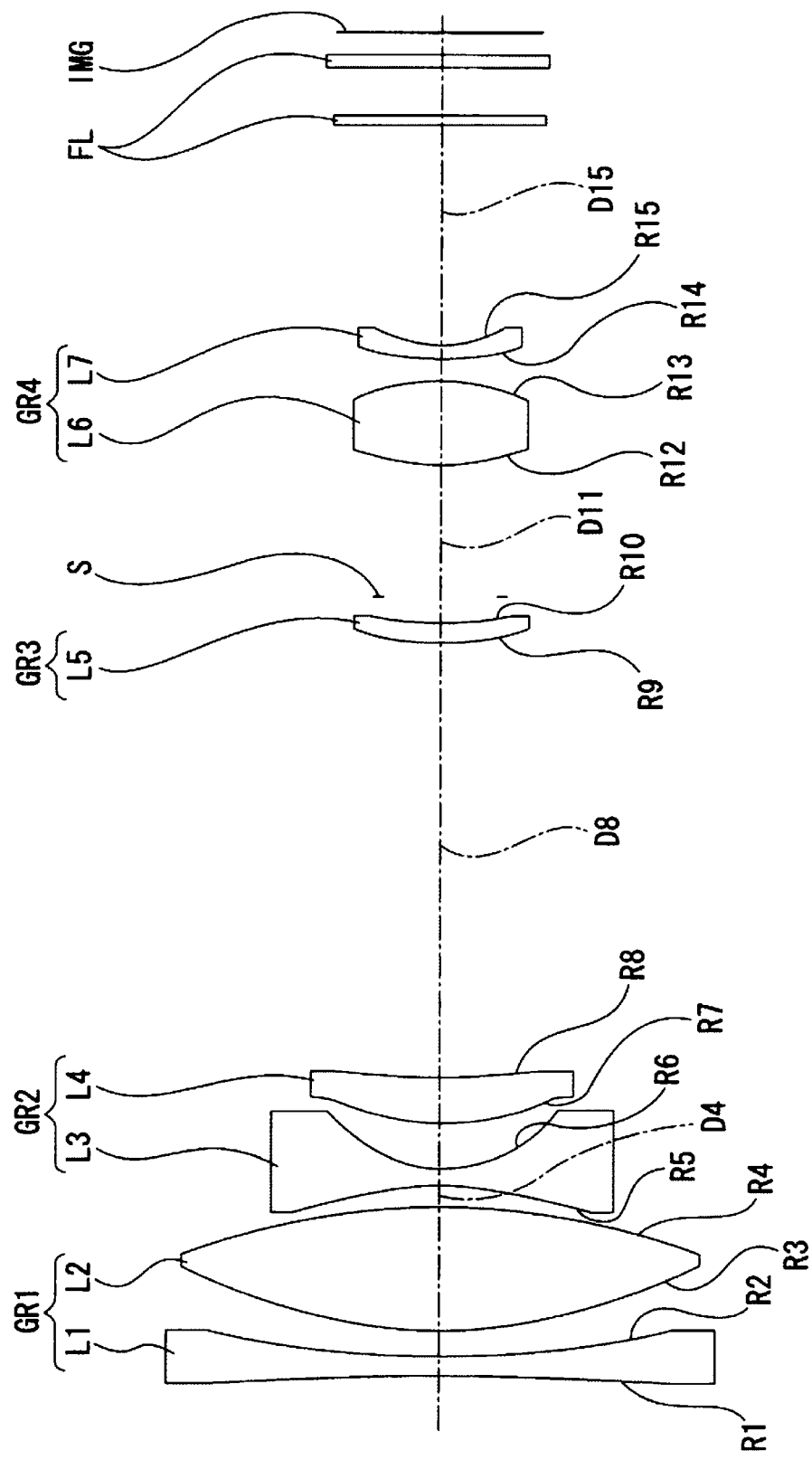
FIG. 11 is a schematic view showing a lens configuration of a zoom lens according to a second embodiment of the present technology.

FIG. 11 shows a lens configuration of a zoom lens 2 according to a second embodiment of the present technology.

Referring to FIG. 11, the zoom lens 2 includes a first lens group GR1 having a positive refracting power, a second lens group GR2 having a negative refracting power, a third lens group GR3 having a positive refracting power, and a fourth lens group GR4 having a positive refracting power. The first lens group GR1, second lens group GR2, third lens group GR3 and fourth lens group GR4 are disposed in order from the object side to the image side.

The first lens group GR1 is normally positioned at a fixed position, and the second lens group GR2 is movable in a direction of an optical axis for zooming. The third lens group GR3 is normally positioned at a fixed position, and the fourth lens group GR4 is movable in a direction of the optical axis for correction of the focal position by zooming and for focusing.

The zoom lens 2 has a zoom ratio set to 4.80 times.

The first lens group GR1 is configured from two lenses including a negative lens L1 and a positive lens L2 disposed in order from the object side to the image side.

The second lens group GR2 is configured from two lenses including a negative lens L3 and a positive lens L4 disposed in order from the object side to the image side.

The third lens group GR3 is configured from a single lens of a positive lens L5.

The fourth lens group GR4 is configured from two lenses including a positive lens L6 and a negative lens L7 disposed in order from the object side to the image side.

A filter FL is disposed between the fourth lens group GR4 and an image plane IMG. An aperture stop S is disposed in the proximity of the third lens group GR3 on the image side.

In the zoom lens 2, the negative lens L1 and the positive lens L2 of the first lens group GR1, the negative lens L3 and the positive lens L4 of the second lens group GR2, the positive lens L5 of the third lens group GR3 and the negative lens L7 of the fourth lens group GR4 are formed from a resin material. Meanwhile, the positive lens L6 of the fourth lens group GR4 is formed from a glass material.

Accordingly, in the zoom lens 2, all of the totaling five lenses of the first to third lens groups GR1 to GR3 are formed from a resin material.

Table 4 indicates lens data of the numerical value example 2 wherein particular numerical values are applied to the zoom lens 2 according to the second embodiment.

TABLE 4

| Si | Ri | Di | Ni | vi |
|---|---|---|---|---|
| 1(ASP) | −147.831 | 0.800 | 1.635 | 23.868 |
| 2(ASP) | 44.377 | 1.096 | | |
| 3(ASP) | 20.687 | 4.790 | 1.531 | 55.907 |
| 4(ASP) | −26.739 | 0.855 | | |
| 5(ASP) | −13.038 | 0.700 | 1.531 | 55.907 |
| 6(ASP) | 5.124 | 1.761 | | |
| 7(ASP) | 9.649 | 1.880 | 1.635 | 23.868 |
| 8(ASP) | 22.869 | 17.020 | | |
| 9(ASP) | 9.847 | 0.855 | 1.583 | 59.460 |
| 10(ASP) | 16.166 | 1.000 | | |
| 11(Aperture stop) | ∞ | 5.163 | | |
| 12(ASP) | 7.939 | 3.300 | 1.497 | 81.558 |
| 13(ASP) | −9.830 | 0.882 | | |
| 14(ASP) | 9.794 | 0.550 | 1.635 | 23.868 |
| 15 | 5.072 | 8.640 | | |
| 16 | ∞ | 0.380 | 1.552 | 63.423 |
| 17 | ∞ | 1.840 | | |
| 18 | ∞ | 0.500 | 1.517 | 64.197 |
| 19 | ∞ | 0.990 | | |
| IMG | ∞ | 0 | | |

In the zoom lens 2, the opposite faces of the negative lens L1 of the first lens group GR1, namely, the first and second faces, the opposite faces of the positive lens L2 of the first lens group GR1, namely, the third and fourth faces, the opposite faces of the negative lens L3 of the second lens group GR2, namely, the fifth and sixth faces, the opposite faces of the positive lens L4 of the second lens group GR2, namely, the seventh and eighth faces, the opposite faces of the positive lens L5 of the third lens group GR3, namely, the ninth and tenth faces, the opposite faces of the positive lens L6 of the fourth length group GR4, namely, the twelfth and thirteenth faces, and the face of the negative lens L7 of the fourth lens group GR4 on the object side, namely, the fourteenth face, are formed as aspheric faces. The fourth, sixth, eighth and tenth order aspheric coefficients A4, A6, A8 and A10 of the aspheric faces in the numerical value example 2 are indicated in Table 5 together with the conic constant κ.

TABLE 5

| | κ | A4 | A6 | A8 | A10 |
|---|---|---|---|---|---|
| 1(ASP) | 0 | 1.230E−06 | 1.429E−07 | −1.169E−09 | 0.000E+00 |
| 2(ASP) | 0 | 3.414E−05 | −4.210E−07 | 1.949E−09 | 0.000E+00 |
| 3(ASP) | 0 | 4.608E−05 | −8.400E−07 | 2.213E−09 | 0.000E+00 |
| 4(ASP) | 0 | 5.968E−05 | −4.702E−07 | 5.611E−10 | 0.000E+00 |
| 5(ASP) | 0 | 4.208E−04 | −1.374E−06 | 0.000E+00 | 0.000E+00 |
| 6(ASP) | 0 | −8.908E−04 | 6.322E−05 | −3.601E−06 | 4.788E−08 |
| 7(ASP) | 0 | −3.301E−04 | 5.052E−05 | −2.322E−06 | 0.000E+00 |
| 8(ASP) | 0 | −2.327E−04 | 2.622E−05 | −2.085E−06 | 0.000E+00 |
| 9(ASP) | 0 | −2.108E−04 | −2.647E−06 | 9.534E−07 | −1.048E−07 |
| 10(ASP) | 0 | −1.432E−04 | 6.335E−06 | 0.000E+00 | 0.000E+00 |
| 12(ASP) | 0 | −1.046E−03 | −3.709E−05 | −2.441E−06 | 1.300E−07 |
| 13(ASP) | 0 | −1.207E−03 | 4.481E−06 | 0.000E+00 | 0.000E+00 |
| 14(ASP) | 0 | −9.361E−04 | 1.545E−05 | 2.319E−06 | 0.000E+00 |

In the zoom lens 2, upon zooming between the wide angle end state and the telephoto end state, the face distance D4 between the first lens group GR1 and the second lens group GR2, the face distance D8 between the second lens group GR2 and the third lens group GR3, the face distance D11 between the aperture stop S and the fourth lens group GR4 and the face distance D15 between the fourth lens group GR4 and the filter FL vary. The variable distances in the wide angle end state, an intermediate focal length state and the telephoto end state among the face distances in the numerical value example 2 are indicated in Table 6 together with the focal length f, F number FNO and half angle ω of view.

TABLE 6

| | Wide angle end | Intermediate | Telephoto end |
|---|---|---|---|
| f | 6.700 | 14.679 | 32.160 |
| FNO | 3.600 | 4.000 | 4.120 |
| ω | 31.241 | 14.066 | 6.562 |
| D4 | 0.855 | 9.998 | 17.504 |
| D8 | 17.02 | 7.87 | 0.37 |
| D11 | 5.164 | 2.963 | 1.509 |
| D15 | 8.64 | 10.84 | 12.3 |

FIGS. 12 to 20 illustrate various aberrations in an infinitely remotely focused state in the numerical value example 2.

Figure 12:
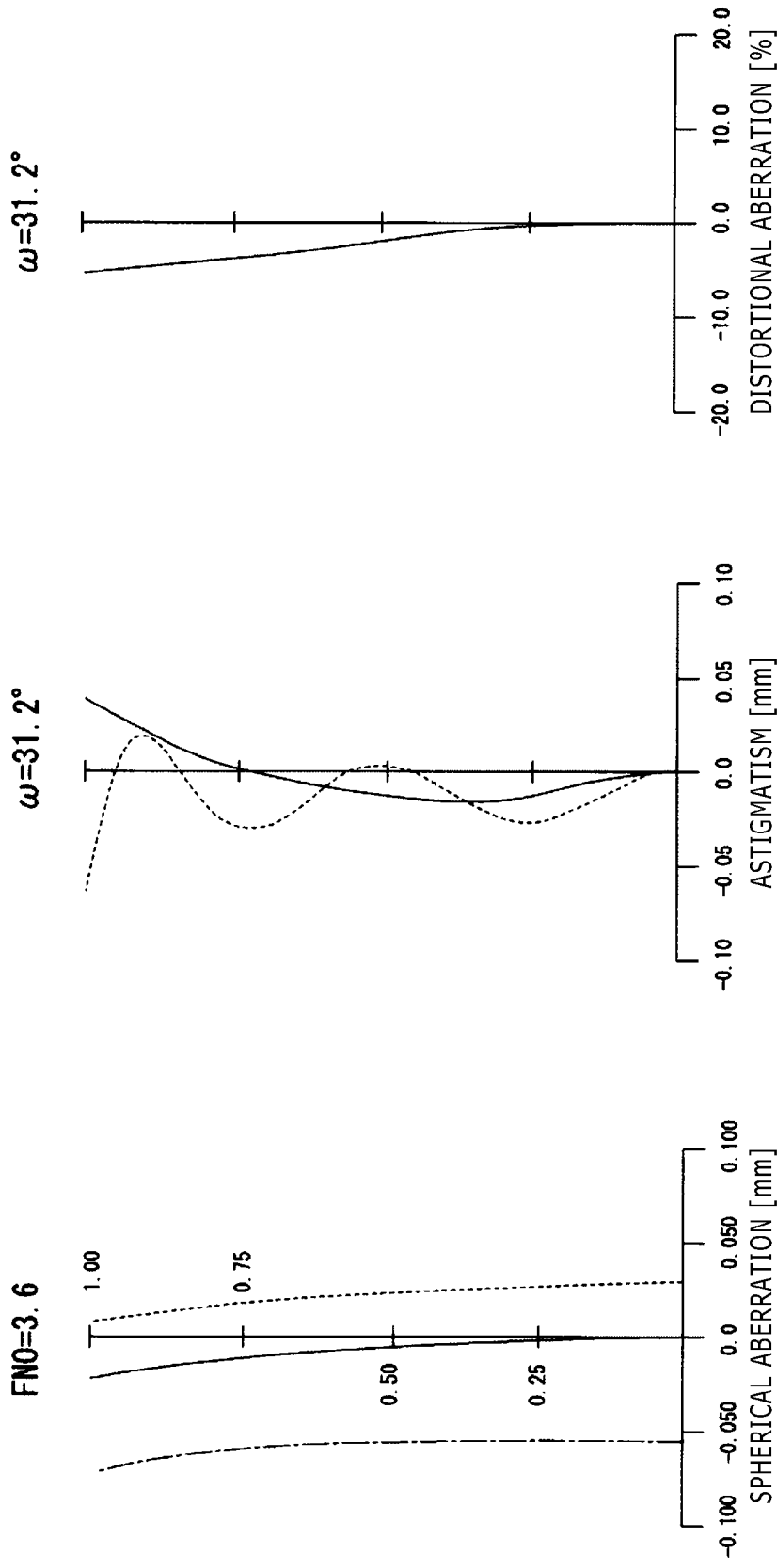
FIG. 12 is a diagrammatic view illustrating a spherical aberration, an astigmatism and a distortional aberration in a wide angle end state of the zoom lens of FIG. 11 according to a numerical value example wherein particular numerical values are applied to the zoom lens together with FIGS. 13 and 14, and particularly illustrating the aberrations at a normal temperature of the zoom lens.

Particularly, FIG. 12 illustrates various aberrations at 25° C., namely, at a normal temperature, in the wide angle end state; FIG. 13 illustrates various aberrations at 60° C., namely, at a high temperature, in the wide angle end state; and FIG. 14 illustrates various aberrations at 0° C., namely, at a low temperature, in the wide angle end state.

Figure 15:
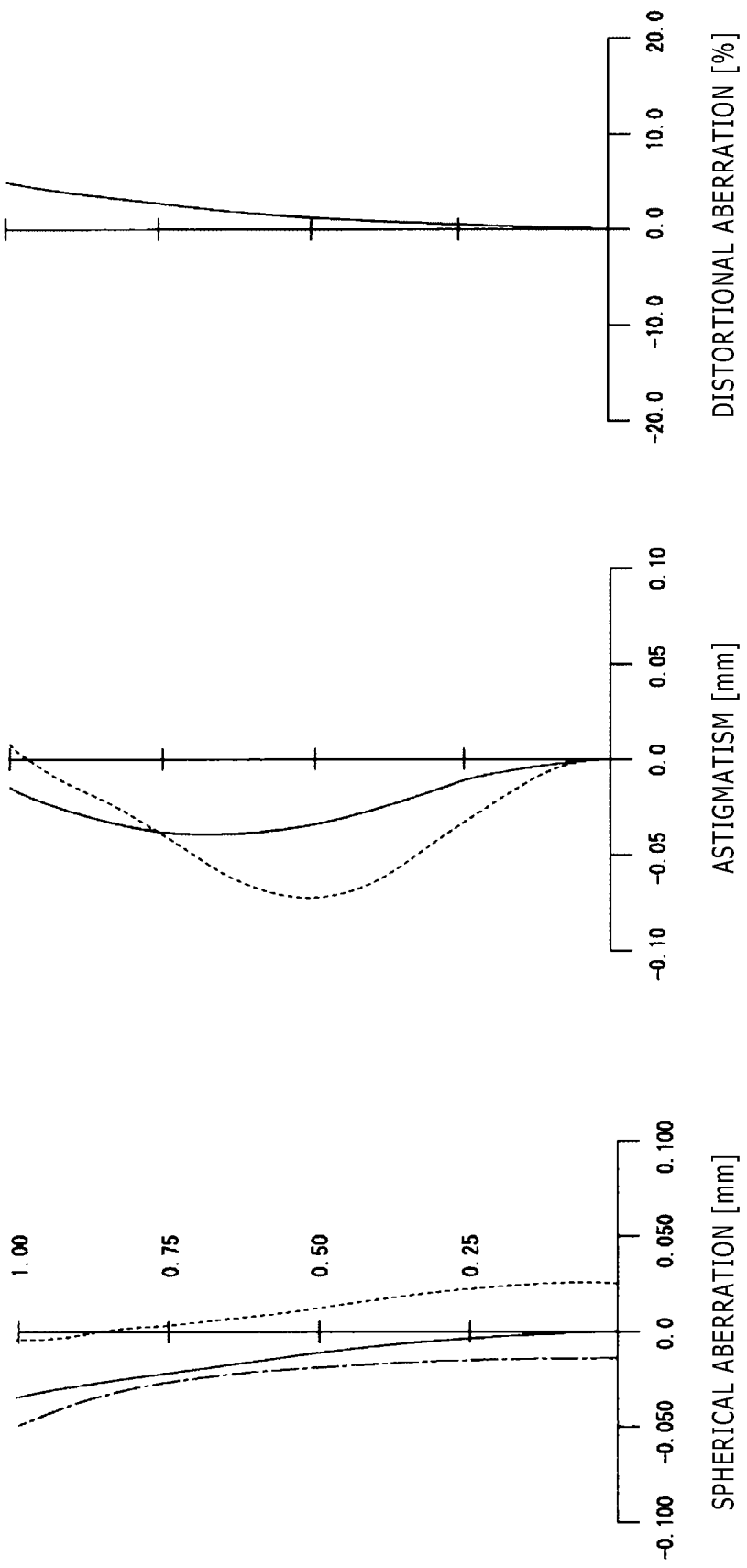
FIG. 15 is a diagrammatic view illustrating a spherical aberration, an astigmatism and a distortional aberration in an intermediate focal length state of the zoom lens of FIG. 11 according to a numerical value example wherein particular numerical values are applied to the zoom lens together with FIGS. 16 and 17, and particularly illustrating the aberrations at a normal temperature of the zoom lens.
Figure 16:
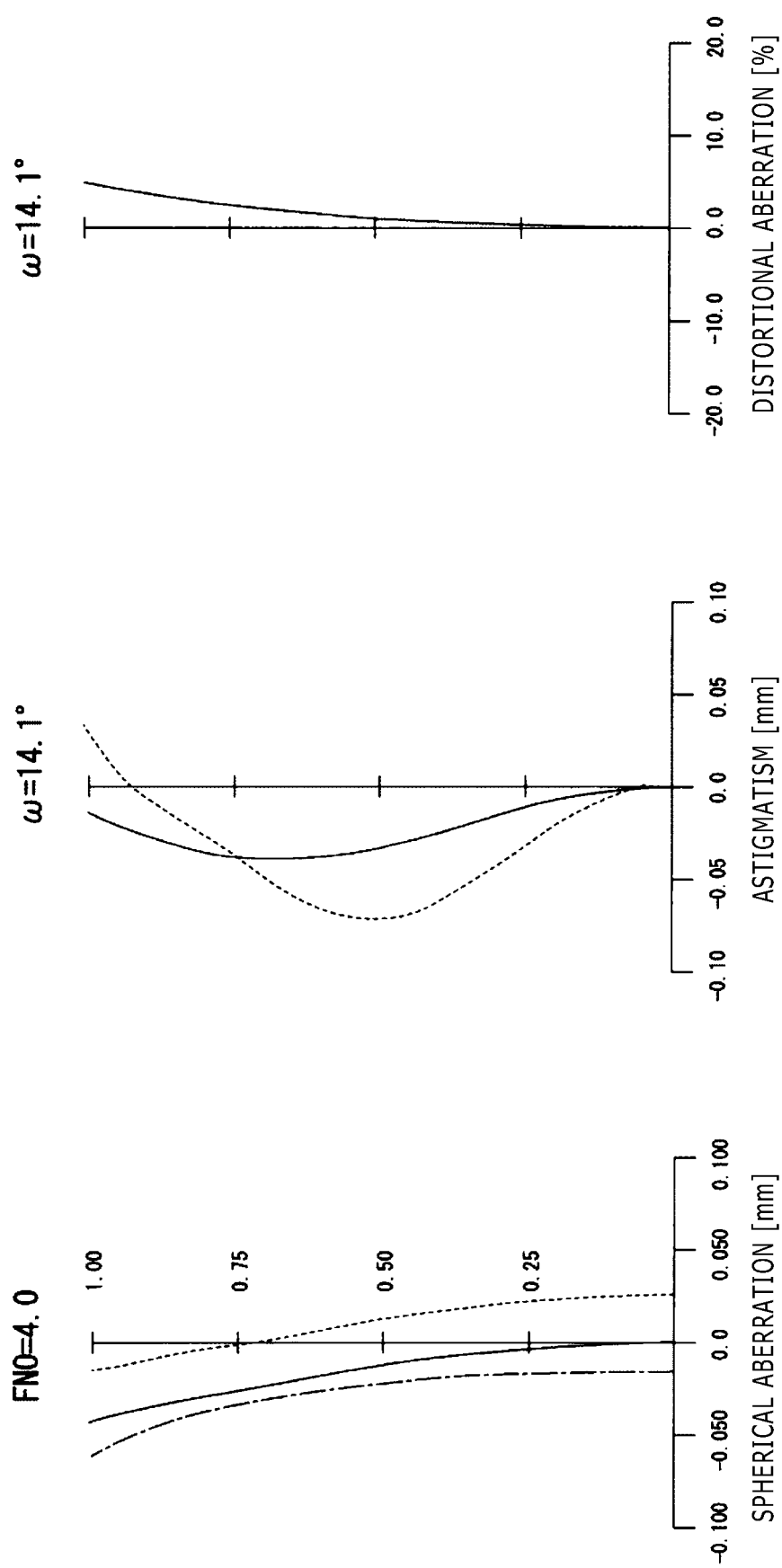
FIG. 16 is a similar view but illustrating a spherical aberration, an astigmatism and a distortional aberration of the zoom lens of FIG. 11 at a high temperature.

FIG. 15 illustrates various aberrations at 25° C., namely, at a normal temperature, in an intermediate focal length state; FIG. 16 illustrates various aberrations at 60° C., namely, at a high temperature, in the intermediate focal length state; and FIG. 17 illustrates various aberrations at 0° C., namely, at a low temperature, in the intermediate focal length state.

Figure 18:
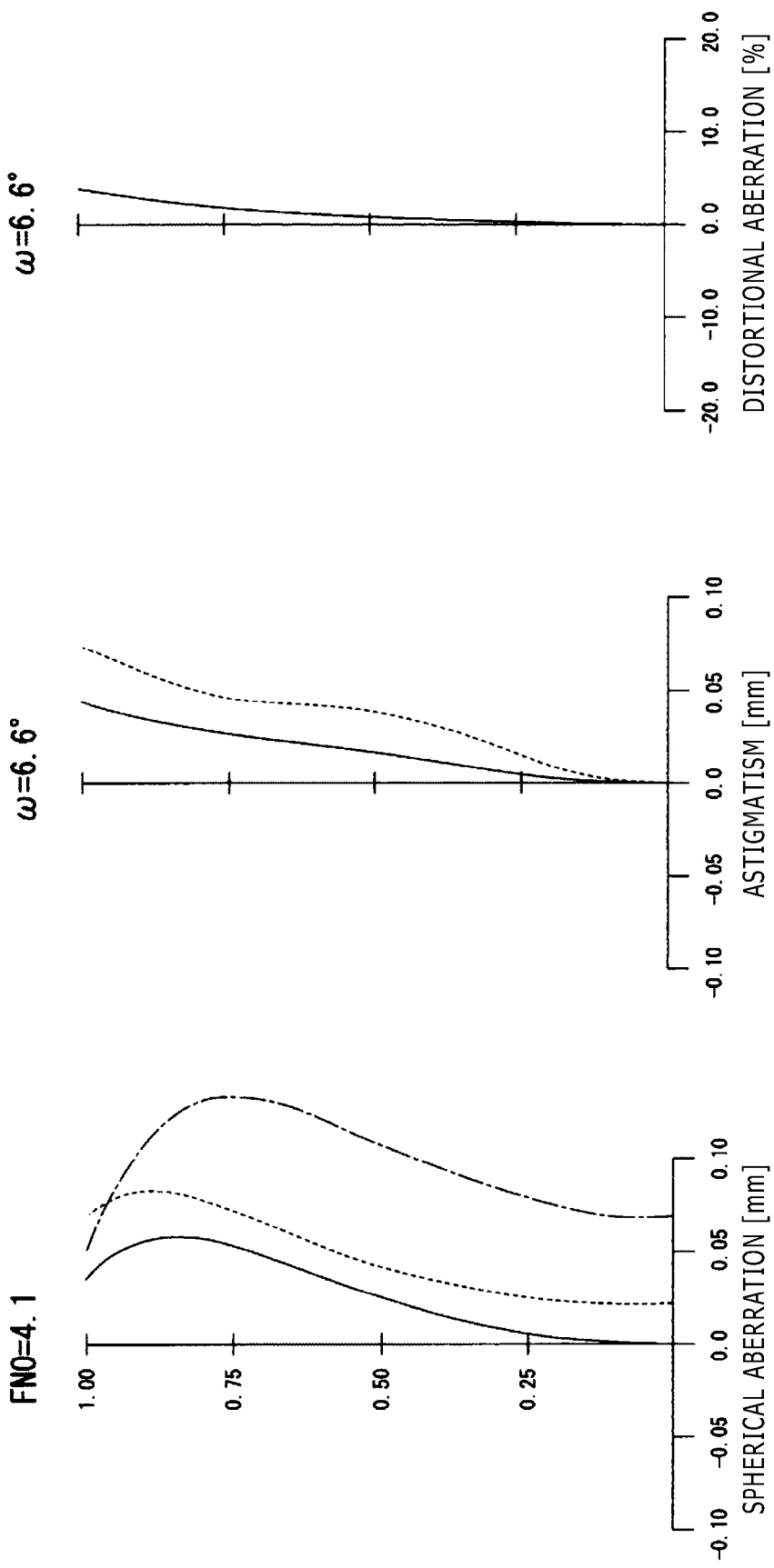
FIG. 18 is a diagrammatic view illustrating a spherical aberration, an astigmatism and a distortional aberration in a telephoto end state of the zoom lens of FIG. 11 according to a numerical value example wherein particular numerical values are applied to the zoom lens together with FIGS. 19 and 20, and particularly illustrating the aberrations at a normal temperature of the zoom lens.
Figure 19:
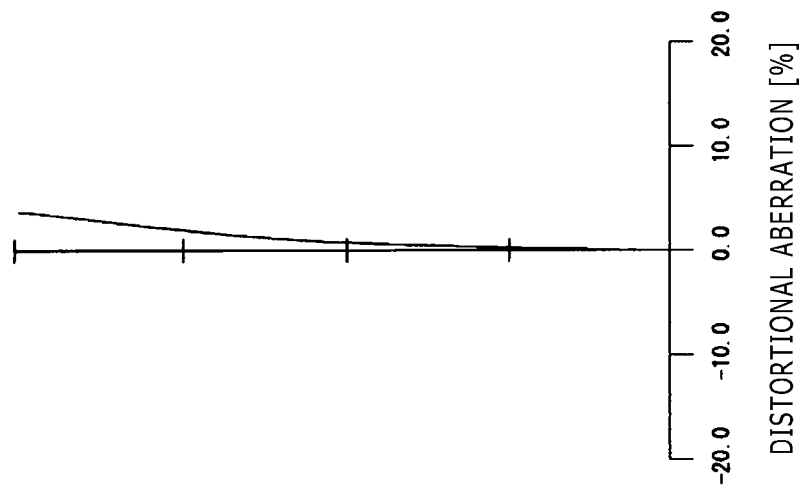
FIG. 19 is a similar view but illustrating a spherical aberration, an astigmatism and a distortional aberration of the zoom lens of FIG. 11 at a high temperature.
Figure 20:
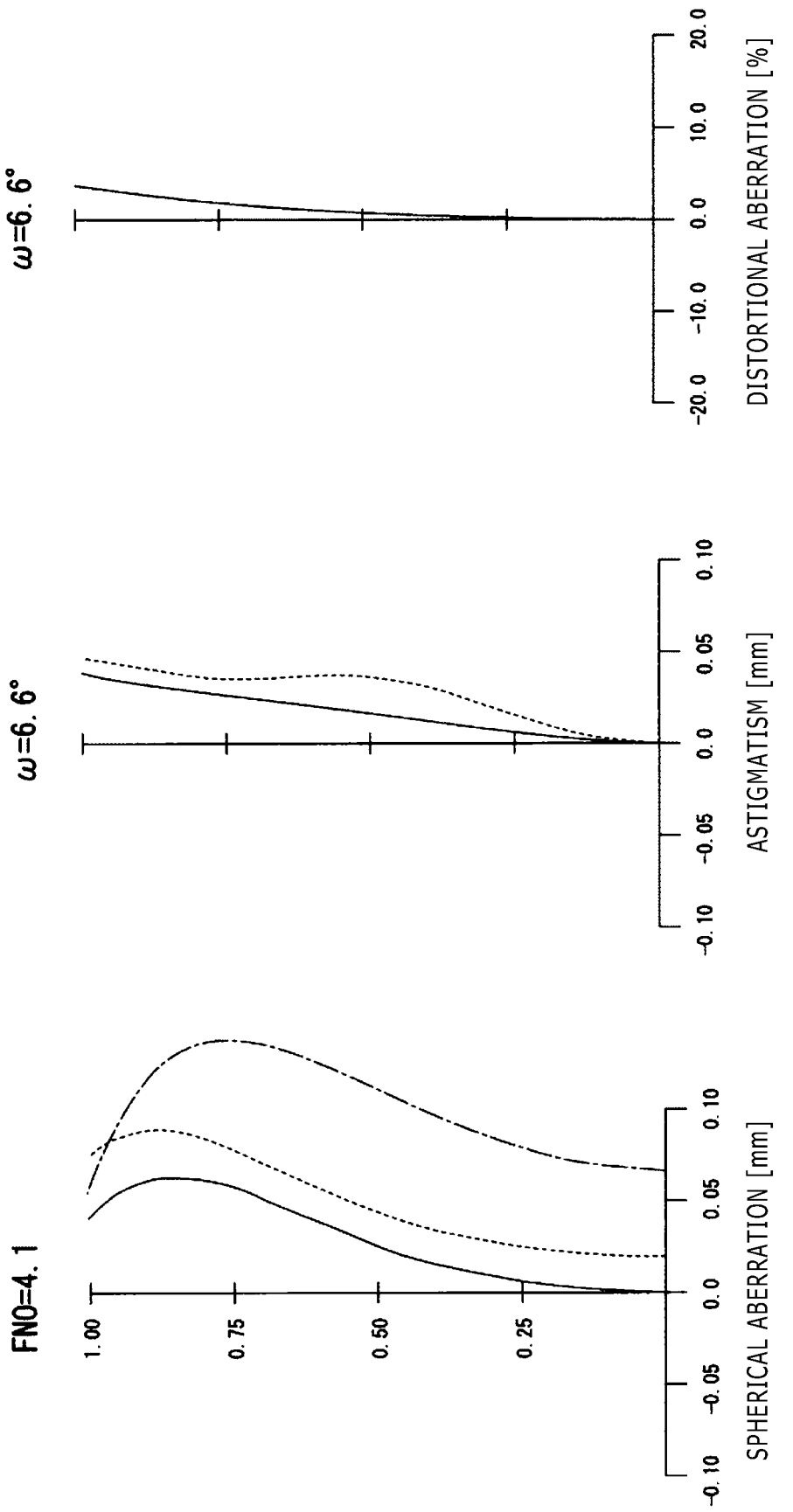
FIG. 20 is a similar view but illustrating a spherical aberration, an astigmatism and a distortional aberration of the zoom lens of FIG. 11 at a low temperature.

FIG. 18 illustrates various aberrations at 25° C., namely, at a normal temperature, in the telephoto end state; FIG. 19 illustrates various aberrations at 60° C., namely, at a high temperature, in the telephoto end state; and FIG. 20 illustrates various aberrations at 0° C., namely, at a low temperature, in the telephoto end state.

In the spherical aberration diagrams of FIGS. 12 to 20, a solid line curve indicates values on the d line (wavelength: 587.56 nm); a broken line curve indicates values on the C line (wavelength: 656.3 nm); and an alternate long and short dash line curve indicates values on the g line (wavelength: 435.8 nm). In the astigmatism diagrams, a solid line curve indicates values on the sagittal image plane of the d line; and a broken line curve indicates values on the meridional image plane of the d line. In the distortional aberration diagrams, a solid line indicates values on the d line.

From the aberration diagrams, it can be recognized apparently that the numeral value example 2 has a superior imaging performance in that the aberrations are corrected favorably.

Third Embodiment

Figure 21:
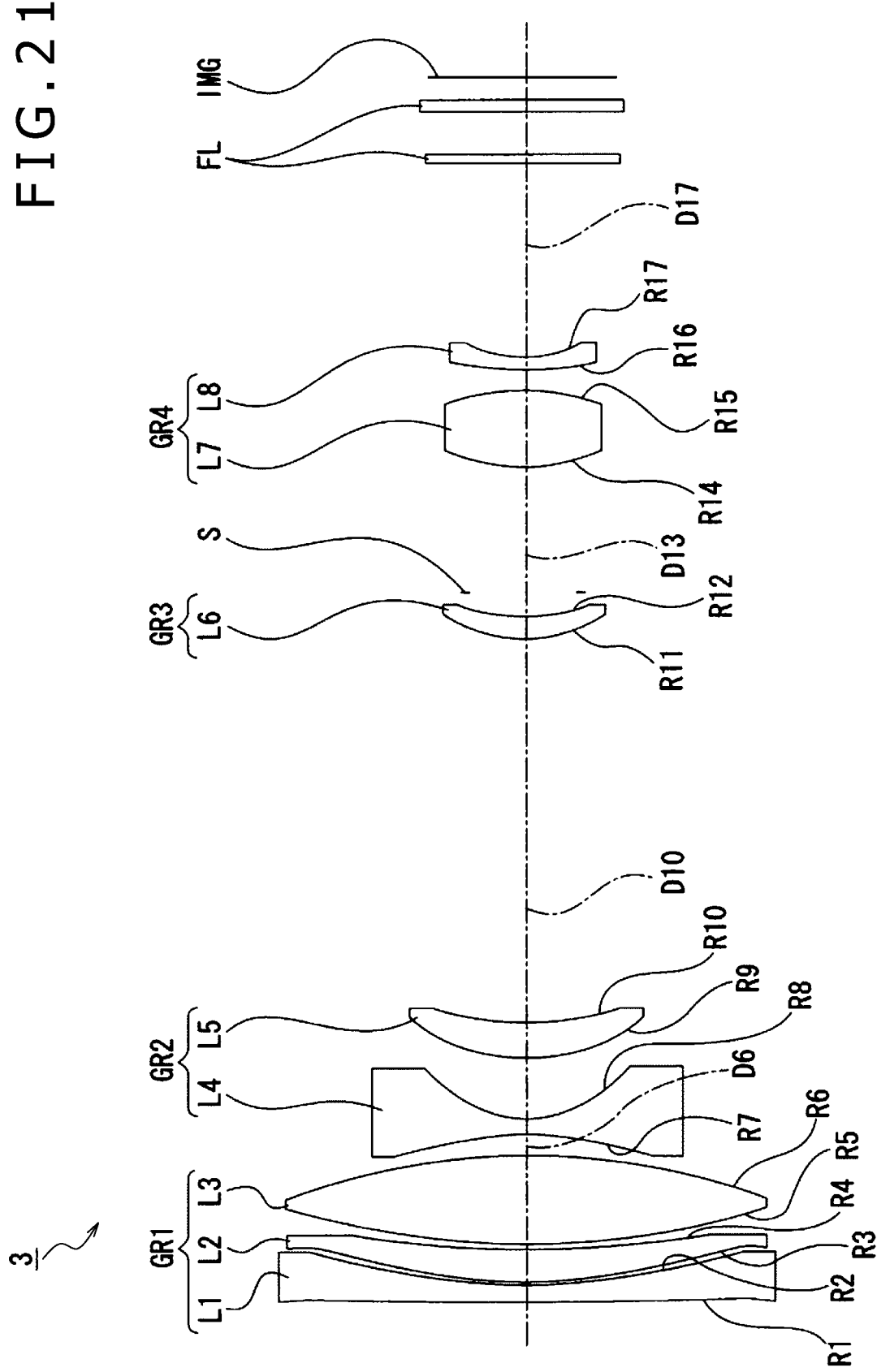
FIG. 21 is a schematic view showing a lens configuration of a zoom lens according to a third embodiment of the present technology.

FIG. 21 shows a lens configuration of a zoom lens 3 according to a third embodiment of the present technology.

Referring to FIG. 21, the zoom lens 3 includes a first lens group GR1 having a positive refracting power, a second lens group GR2 having a negative refracting power, a third lens group GR3 having a positive refracting power, and a fourth lens group GR4 having a positive refracting power. The first lens group GR1, second lens group GR2, third lens group GR3 and fourth lens group GR4 are disposed in order from the object side to the image side.

The first lens group GR1 is normally positioned at a fixed position, and the second lens group GR2 is movable in a direction of an optical axis for zooming. The third lens group GR3 is normally positioned at a fixed position, and the fourth lens group GR4 is movable in a direction of the optical axis for correction of the focal position by zooming and for focusing.

The zoom lens 3 has a zoom ratio set to 4.80 times.

The first lens group GR1 is configured from three lenses including a negative lens L1, a positive lens L2 and another positive lens L3 disposed in order from the object side to the image side.

The second lens group GR2 is configured from two lenses including a negative lens L4 and a positive lens L5 disposed in order from the object side to the image side.

The third lens group GR3 is configured from a single lens of a positive lens L6.

The fourth lens group GR4 is configured from two lenses including a positive lens L7 and a negative lens L8 disposed in order from the object side to the image side.

A filter FL is disposed between the fourth lens group GR4 and an image plane IMG. An aperture stop S is disposed in the proximity of the third lens group GR3 on the image side.

In the zoom lens 3, the negative lens L1 and the positive lens L3 of the first lens group GR1, the negative lens L4 and the positive lens L5 of the second lens group GR2, the positive lens L6 of the third lens group GR3 and the negative lens L8 of the fourth lens group GR4 are formed from a resin material. Meanwhile, the positive lens L2 of the first lens group GR1 and the positive lens L7 of the fourth lens group GR4 are formed from a glass material.

Accordingly, in the zoom lens 3, five ones from among the totaling six lenses of the first to third lens groups GR1 to GR3 are formed from a resin material.

Table 7 indicates lens data of the numerical value example 3 wherein particular numerical values are applied to the zoom lens 3 according to the third embodiment.

TABLE 7

| Si | Ri | Di | Ni | vi |
| --- | --- | --- | --- | --- |
| 1(ASP) | 217.539 | 0.800 | 1.6349 | 23.8684 |
| 2(ASP) | 30.579 | 0.100 | | |
| 3(ASP) | 22.783 | 1.400 | 1.5311 | 55.9073 |
| 4(ASP) | 46.348 | 0.150 | | |
| 5(ASP) | 34.882 | 3.979 | 1.5311 | 55.9073 |
| 6(ASP) | −27.706 | 0.868 | | |
| 7(ASP) | −12.149 | 0.700 | 1.5311 | 55.9073 |
| 8(ASP) | 5.451 | 2.581 | | |
| 9(ASP) | 9.066 | 1.558 | 1.6349 | 23.8684 |
| 10(ASP) | 15.168 | 16.620 | | |
| 11(ASP) | 6.933 | 0.934 | 1.5311 | 55.9073 |
| 12(ASP) | 10.064 | 1.000 | | |
| 13(Aperture stop) | ∞ | 5.450 | | |
| 14(ASP) | 7.193 | 3.300 | 1.4971 | 81.5584 |
| 15(ASP) | −11.908 | 0.902 | | |
| 16(ASP) | 11.799 | 0.550 | 1.6349 | 23.8684 |
| 17 | 5.623 | 8.398 | | |
| 18 | ∞ | 0.380 | 1.5523 | 63.4232 |
| 19 | ∞ | 1.840 | | |
| 20 | ∞ | 0.500 | 1.5168 | 64.1973 |
| 21 | ∞ | 0.990 | | |
| IMG | ∞ | 0.000 | | |

In the zoom lens 3, the opposite faces of the negative lens L1 of the first lens group GR1, namely, the first and second faces, the opposite faces of the positive lens L2 of the first lens group GR1, namely, the third and fourth faces, the opposite faces of the positive lens L3 of the first lens group GR1, namely, the fifth and sixth faces, the opposite faces of the negative lens L4 of the second lens group GR2, namely, the seventh and eighth faces, the opposite faces of the positive lens L5 of the second lens group GR2, namely, the ninth and tenth faces, the opposite faces of the positive lens L6 of the third length group GR3, namely, the eleventh and twelfth faces, the opposite faces of the positive lens L7 of the fourth length group GR4, namely, the fourteenth and fifteenth faces, and the face of the negative lens L8 of the fourth lens group GR4 on the object side, namely, the sixteenth face, are formed as aspheric faces. The fourth, sixth, eighth and tenth order aspheric coefficients A4, A6, A8 and A10 of the aspheric faces in the numerical value example 3 are indicated in Table 8 together with the conic constant κ.

TABLE 8

| | κ | A4 | A6 | A8 | A10 |
| --- | --- | --- | --- | --- | --- |
| 1(ASP) | 0.000 | −2.686E−05 | 2.632E−07 | −2.265E−09 | 0.000E+00 |
| 2(ASP) | 0.000 | −1.707E−05 | 1.526E−07 | −2.138E−09 | 0.000E+00 |
| 3(ASP) | 0.000 | −1.802E−05 | −6.940E−07 | −2.950E−10 | 0.000E+00 |
| 4(ASP) | 0.000 | 1.803E−05 | −7.876E−07 | 1.311E−09 | 0.000E+00 |
| 5(ASP) | 0.000 | 4.343E−05 | −3.532E−07 | 2.255E−10 | 0.000E+00 |
| 6(ASP) | 0.000 | 3.446E−05 | −3.186E−07 | 0.000E+00 | 0.000E+00 |
| 7(ASP) | 0.000 | 5.158E−04 | −1.702E−06 | 0.000E+00 | 0.000E+00 |
| 8(ASP) | 0.000 | −6.024E−04 | 3.534E−05 | −1.285E−06 | 2.570E−08 |
| 9(ASP) | 0.000 | −1.694E−05 | 3.739E−05 | −8.957E−07 | 0.000E+00 |
| 10(ASP) | 0.000 | 9.751E−05 | 3.181E−05 | −1.243E−06 | 0.000E+00 |
| 11(ASP) | 0.000 | 3.371E−04 | 2.528E−05 | 7.640E−07 | −9.118E−08 |
| 12(ASP) | 0.000 | 6.439E−04 | 4.387E−05 | 0.000E+00 | 0.000E+00 |
| 14(ASP) | 0.000 | −7.671E−04 | −2.306E−05 | −1.518E−06 | 1.050E−07 |
| 15(ASP) | 0.000 | −1.218E−03 | 2.279E−05 | 0.000E+00 | 0.000E+00 |
| 16(ASP) | 0.000 | −1.300E−03 | 2.176E−05 | 1.327E−06 | 0.000E+00 |

In the zoom lens 3, upon zooming between the wide angle end state and the telephoto end state, the face distance D6 between the first lens group GR1 and the second lens group GR2, the face distance D10 between the second lens group GR2 and the third lens group GR3, the face distance D13 between the aperture stop S and the fourth lens group GR4 and the face distance D17 between the fourth lens group GR4 and the filter FL vary. The variable distances in the wide angle end state, an intermediate focal length state and the telephoto end state among the face distances in the numerical value example 3 are indicated in Table 9 together with the focal length f, F number FNO and half angle ω of view.

TABLE 9

| | Wide angle end | Intermediate | Telephoto end |
| --- | --- | --- | --- |
| f | 6.700 | 14.679 | 32.160 |
| FNO | 3.578 | 3.988 | 4.245 |
| ω | 31.241 | 14.085 | 6.560 |

TABLE 9-continued

|  | Wide angle end | Intermediate | Telephoto end |
|---|---|---|---|
| D6 | 0.868 | 9.651 | 16.706 |
| D10 | 16.62 | 7.84 | 0.78 |
| D13 | 5.450 | 3.153 | 1.482 |
| D17 | 8.398 | 10.695 | 12.365 |

FIGS. 22 to 30 illustrate various aberrations in an infinitely remotely focused state in the numerical value example 3.

Figure 22:
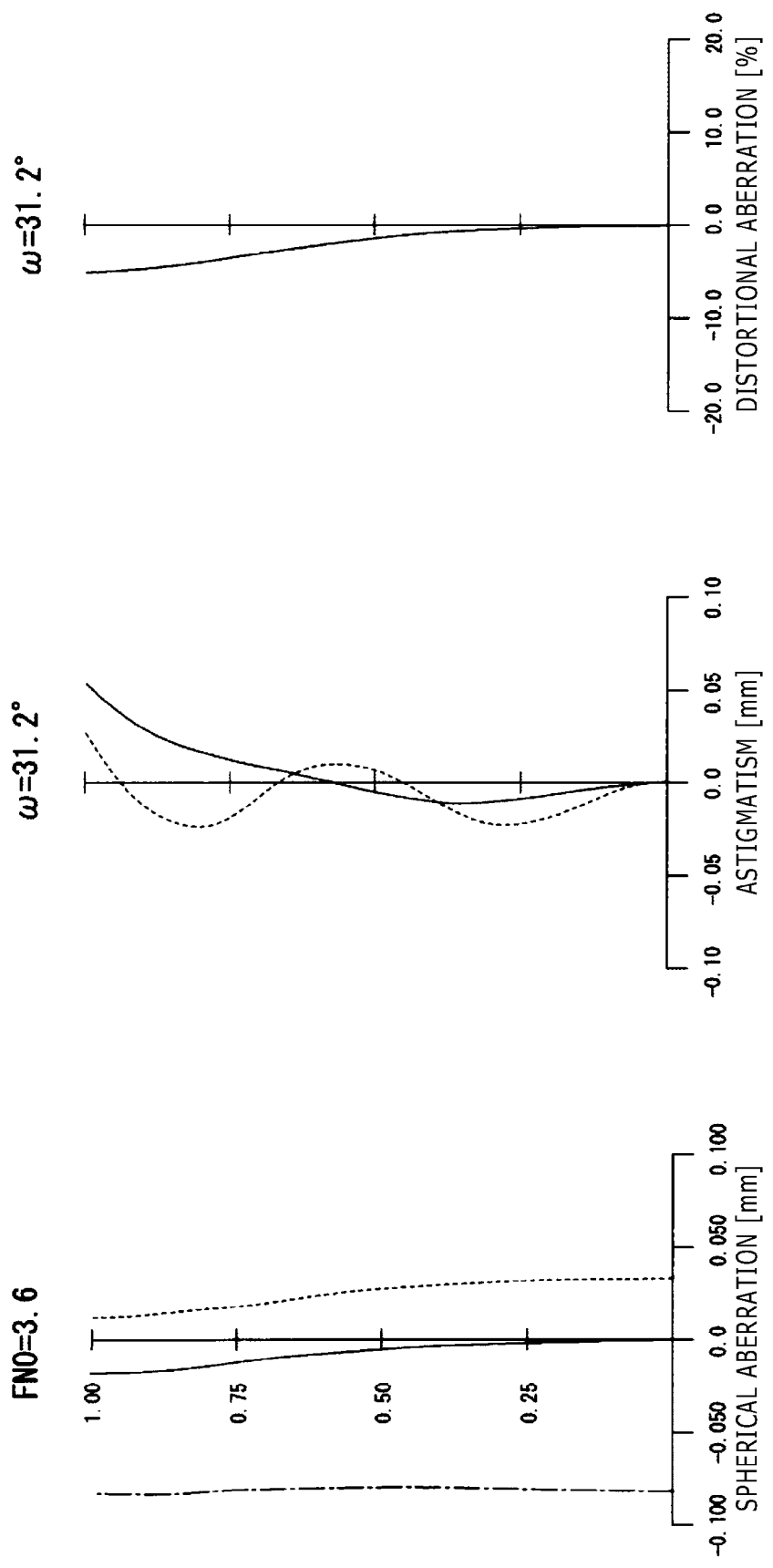
FIG. 22 is a diagrammatic view illustrating a spherical aberration, an astigmatism and a distortional aberration in a wide angle end state of the zoom lens of FIG. 21 according to a numerical value example wherein particular numerical values are applied to the zoom lens together with FIGS. 23 and 24, and particularly illustrating the aberrations at a normal temperature of the zoom lens.

Particularly, FIG. 22 illustrates various aberrations at 25° C., namely, at a normal temperature, in the wide angle end state; FIG. 23 illustrates various aberrations at 60° C., namely, at a high temperature, in the wide angle end state; and FIG. 24 illustrates various aberrations at 0° C., namely, at a low temperature, in the wide angle end state.

Figure 27:
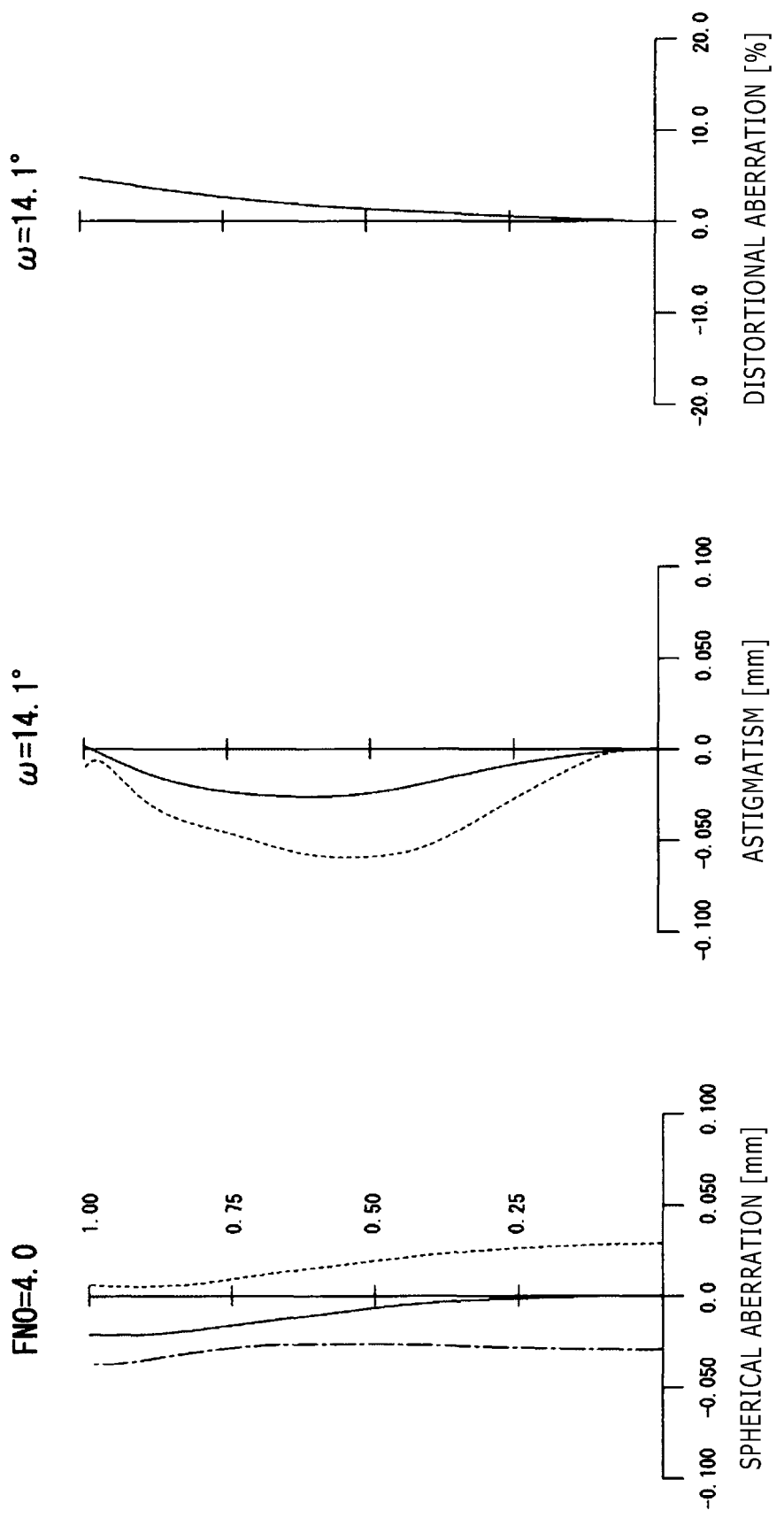
FIG. 27 is a similar view but illustrating a spherical aberration, an astigmatism and a distortional aberration of the zoom lens of FIG. 21 at a low temperature.

FIG. 25 illustrates various aberrations at 25° C., namely, at a normal temperature, in an intermediate focal length state; FIG. 26 illustrates various aberrations at 60° C., namely, at a high temperature, in the intermediate focal length state; and FIG. 27 illustrates various aberrations at 0° C., namely, at a low temperature, in the intermediate focal length state.

Figure 28:
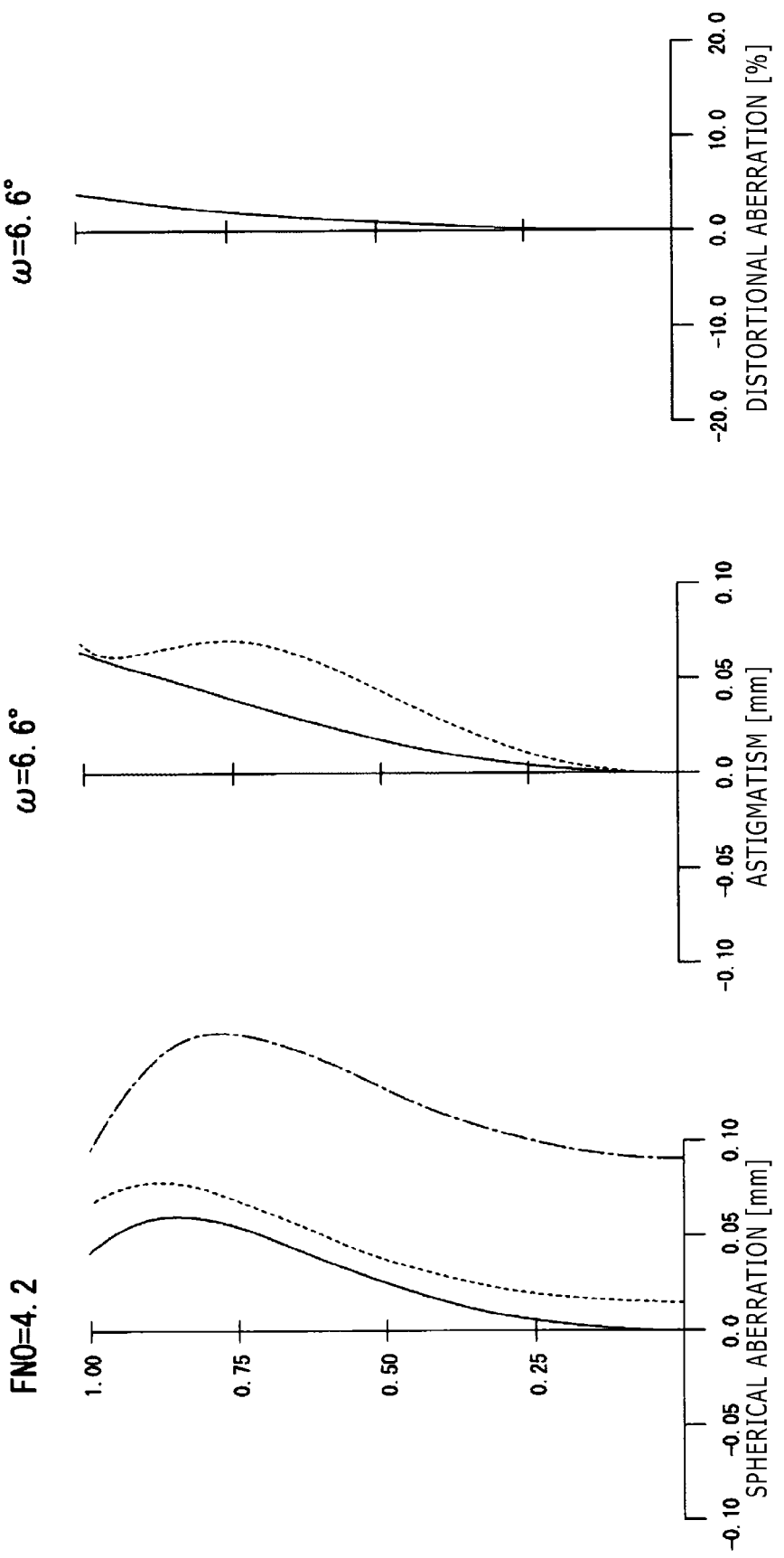
FIG. 28 is a diagrammatic view illustrating a spherical aberration, an astigmatism and a distortional aberration in a telephoto end state of the zoom lens of FIG. 21 according to a numerical value example wherein particular numerical values are applied to the zoom lens together with FIGS. 29 and 30, and particularly illustrating the aberrations at a normal temperature of the zoom lens.
Figure 29:
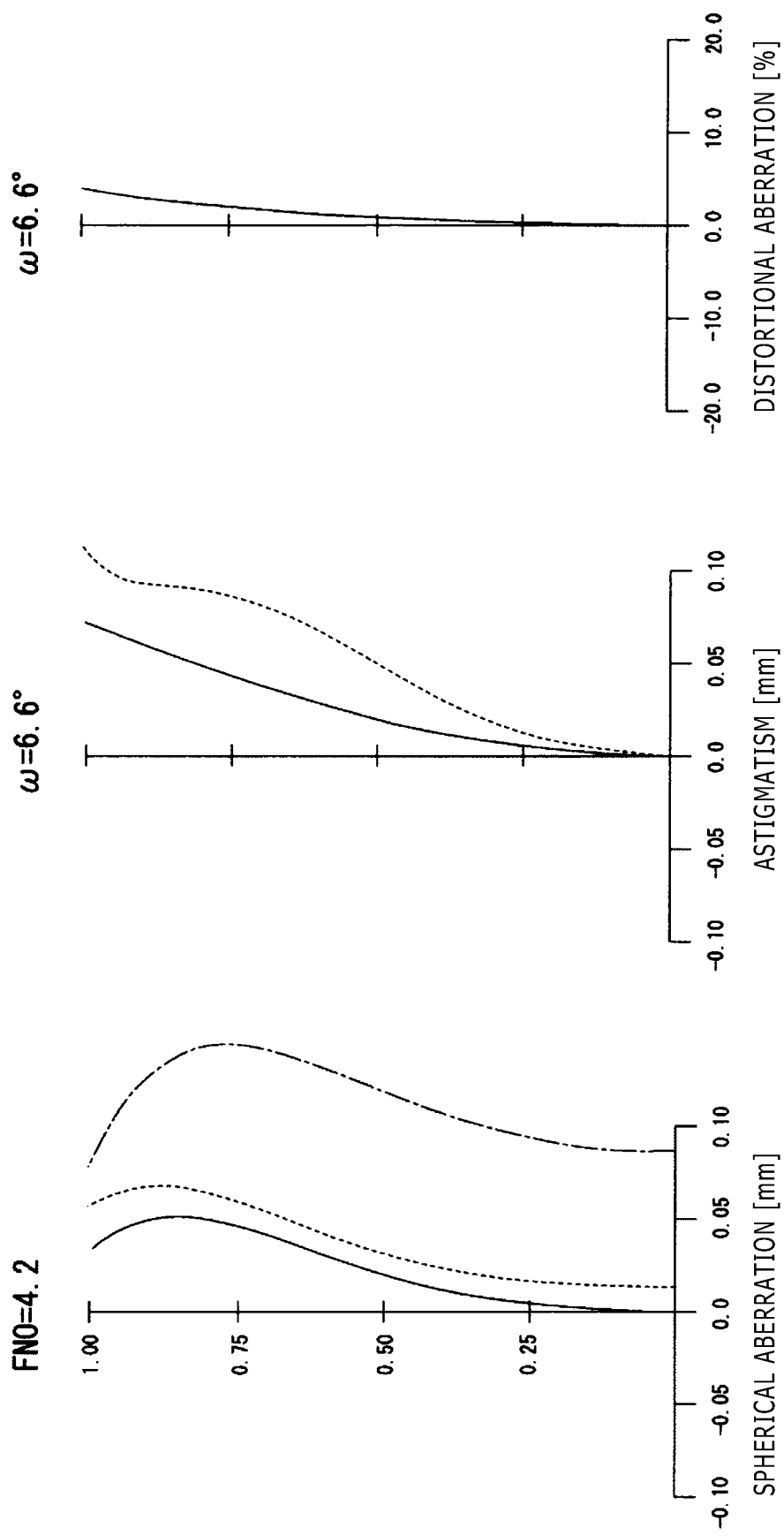
FIG. 29 is a similar view but illustrating a spherical aberration, an astigmatism and a distortional aberration of the zoom lens of FIG. 21 at a high temperature.
Figure 30:
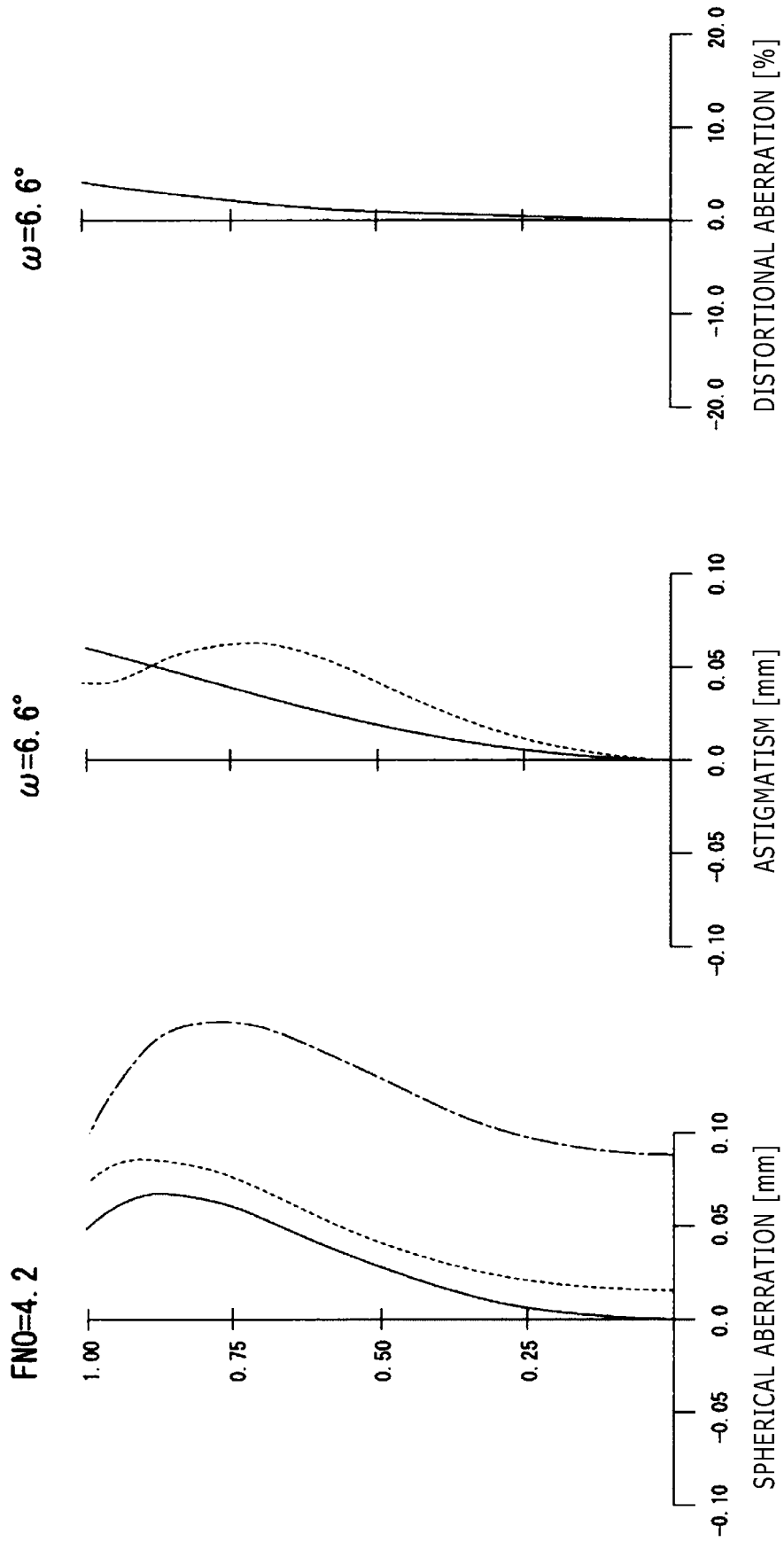
FIG. 30 is a similar view but illustrating a spherical aberration, an astigmatism and a distortional aberration of the zoom lens of FIG. 21 at a low temperature.

FIG. 28 illustrates various aberrations at 25° C., namely, at a normal temperature, in the telephoto end state; FIG. 29 illustrates various aberrations at 60° C., namely, at a high temperature, in the telephoto end state; and FIG. 30 illustrates various aberrations at 0° C., namely, at a low temperature, in the telephoto end state.

In the spherical aberration diagrams of FIGS. 22 to 30, a solid line curve indicates values on the d line (wavelength: 587.56 nm); a broken line curve indicates values on the C line (wavelength: 656.3 nm); and an alternate long and short dash line curve indicates values on the g line (wavelength: 435.8 nm). In the astigmatism diagrams, a solid line curve indicates values on the sagittal image plane of the d line; and a broken line curve indicates values on the meridional image plane of the d line. In the distortional aberration diagrams, a solid line indicates values on the d line.

From the aberration diagrams, it can be recognized apparently that the numeral value example 3 has a superior imaging performance in that the aberrations are corrected favorably.

Values of the Conditional Expressions of the Zoom Lens

In the following, values of the conditional expressions of the zoom lenses 1 to 3 of the first to third embodiments are described.

Table 10 illustrates values of the conditional expressions (1) to (3) with regard to the zoom lenses 1 to 3.

|  |  | First Embodiment | Second Embodiment | Third Embodiment |
|---|---|---|---|---|
|  | fw | 6.70 | 6.70 | 6.70 |
|  | ft | 32.16 | 32.16 | 32.16 |
| Conditional expression (1) | 4.0 < ft/fw | 4.80 | 4.80 | 4.80 |
|  | f1 to 3 (Wide angle end) | −256.59 | −79.39 | −97.89 |
| Conditional expression (2) | −100.0 < f1 to 3 (Wide angle end)/fw < 6.4 | −38.30 | −11.85 | −14.61 |
|  | f1 to 3 (Intermediate focal length) | −82.90 | −63.35 | −66.82 |
| Conditional expression (2) | −100.0 < f1 to 3 (Intermediate focal length)/fw < 6.4 | −12.37 | −9.46 | −9.97 |
|  | f1 to 3 (Telephoto end) | −114.08 | −99.70 | −99.54 |
| Conditional expression (2) | −100.0 < f1 to 3 (Telephoto end)/fw < 6.4 | −17.03 | −14.88 | −14.86 |
|  | fp1 | 4.81 | 4.58 | 3.32 |
| Conditional expression (3) | −1.0 < fp1/fw < 2.5 | 0.72 | 0.68 | 0.50 |

As can be recognized apparently from Table 10, the zoom lenses 1 to 3 satisfy the conditional expressions (1) to (3).

Amount of Movement of the Focus of the Zoom Lens by a Temperature Variation

In the following, an amount of movement of the focus of the zoom lenses 1 to 3 of the first to third embodiments by a temperature variation is described.

Table 11 indicates an amount of movement of the focus when the temperature of the zoom lenses 1 to 3 varies from a normal temperature, namely, from 25° C., to 60° C., namely, to a high temperature, or to 0° C., namely, to a low temperature. The unit of the amount of movement is μm, and the positive sign of a numerical value indicates movement toward the object side while the negative sign of a numerical value indicates movement toward the image side.

TABLE 11

|  | First Embodiment | Second Embodiment | Third Embodiment |
|---|---|---|---|
| Temperature variation (25° C. to 60° C.), focus movement amount (wide angle end) | −21.6 | −73.7 | −24.3 |
| Temperature variation (25° C. to 0° C.), focus movement amount (wide angle end) | +16.4 | +51.4 | +18.1 |
| Temperature variation (25° C. to 60° C.), focus movement amount (intermediate focal length) | −46.4 | −113.6 | −48.9 |
| Temperature variation (25° C. to 0° C.), focus movement amount (intermediate focal length) | +34.1 | +78.9 | +35.8 |
| Temperature variation (25° C. to 60° C.), focus movement amount (telephoto end) | −0.5 | −81.7 | −5.7 |
| Temperature variation (25° C. to 0° C.), focus movement amount (telephoto end) | +6.8 | +59.7 | +10.1 |

(unit: μm)

Within the range of the amount of movement of the focus indicated in Table 11, the movement does not disturb the optical performance of the zoom lenses 1 to 3, and also the amount of movement of the focus upon temperature variation is compensated for sufficiently. Thus, a stabilized optical performance is assured under the environment over a wide temperature range.

Configuration of the Image Pickup Apparatus

The image pickup apparatus of the present technology includes a zoom lens which in turn includes a first lens group having a positive refracting power and normally positioned at a fixed position, a second lens group having a negative refracting power and movable in the direction of an optical axis for zooming, and a third lens group having a positive refracting power and normally positioned at a fixed position. The first, second and third lens groups are disposed in order from the object side to the image side.

Further, in the zoom lens of the image pickup apparatus of the present technology, two thirds or more lenses from among a number of lenses which configure the first to third lens groups are formed from resin material, and conditional expressions (1) and (2) given below are satisfied:

$$4.0 < ft/fw \quad (1)$$

$$-100.0 < f1 \text{ to } 3/fw < -6.4 \quad (2)$$

where fw is the focal length of the entire lens system in a wide angle end state, ft is the focal length of the entire lens system in a telephoto end state, and f1 to 3 is the combined focal length of the first to third lens groups (at all zoom positions).

In the zoom lens of the image pickup apparatus of the present technology, two thirds or more lenses from among the number of lenses which configure the first to third lens groups are formed from resin material as described above. Consequently, reduction of the cost and reduction of the weight can be anticipated.

The conditional expression (1) defines a magnification, and the conditional expression (2) defines a ratio between the combined focal length of the first to third lens groups and the focal length of the entire lens system at a wide angle end.

Where many lenses are formed from a resin material having a refractive index which exhibits a great variation in response to the temperature variation as described above, there is the possibility that defocusing upon temperature variation and degradation of the resolution performance by such defocusing may occur. Particularly with a zoom lens which achieves an enhanced magnification as represented by the conditional expression (1), defocusing upon temperature variation and degradation of the resolution performance by such defocusing are likely to occur at all zoom positions.

Therefore, in the image pickup apparatus of the present technology, an increased magnification is achieved in accordance with the conditional expression (1), and besides defocusing and degradation of the resolution performance described above are suppressed in accordance with the conditional expression (2).

In particular, if the combined focal length of the first to third lens groups exceeds the lower limit of the conditional expression (2), then also the variation amount of the refractive index upon temperature variation increases together. Consequently, it becomes difficult to suppress the degradation of the temperature characteristic such as defocusing and degradation of the resolution performance which occurs at this time. Further, if the ratio described hereinabove does not fall within the range of the conditional expression (2) at all zoom positions, then it is difficult to compensate for the optical performance at all zoom positions.

Accordingly, if the zoom lens satisfies the conditional expressions (1) and (2), then a good optical performance can be assured while an increased magnification is achieved.

It is to be noted that the zoom lens more preferably satisfies the following conditional expression (2)':

$$-50.0 < f1 \text{ to } 3/fw < -8.0 \quad (2)'$$

Where the zoom lens satisfies the conditional expression (2)', defocusing and degradation of the resolution performance can be suppressed further.

Form of the Image Pickup Apparatus

Figure 31:
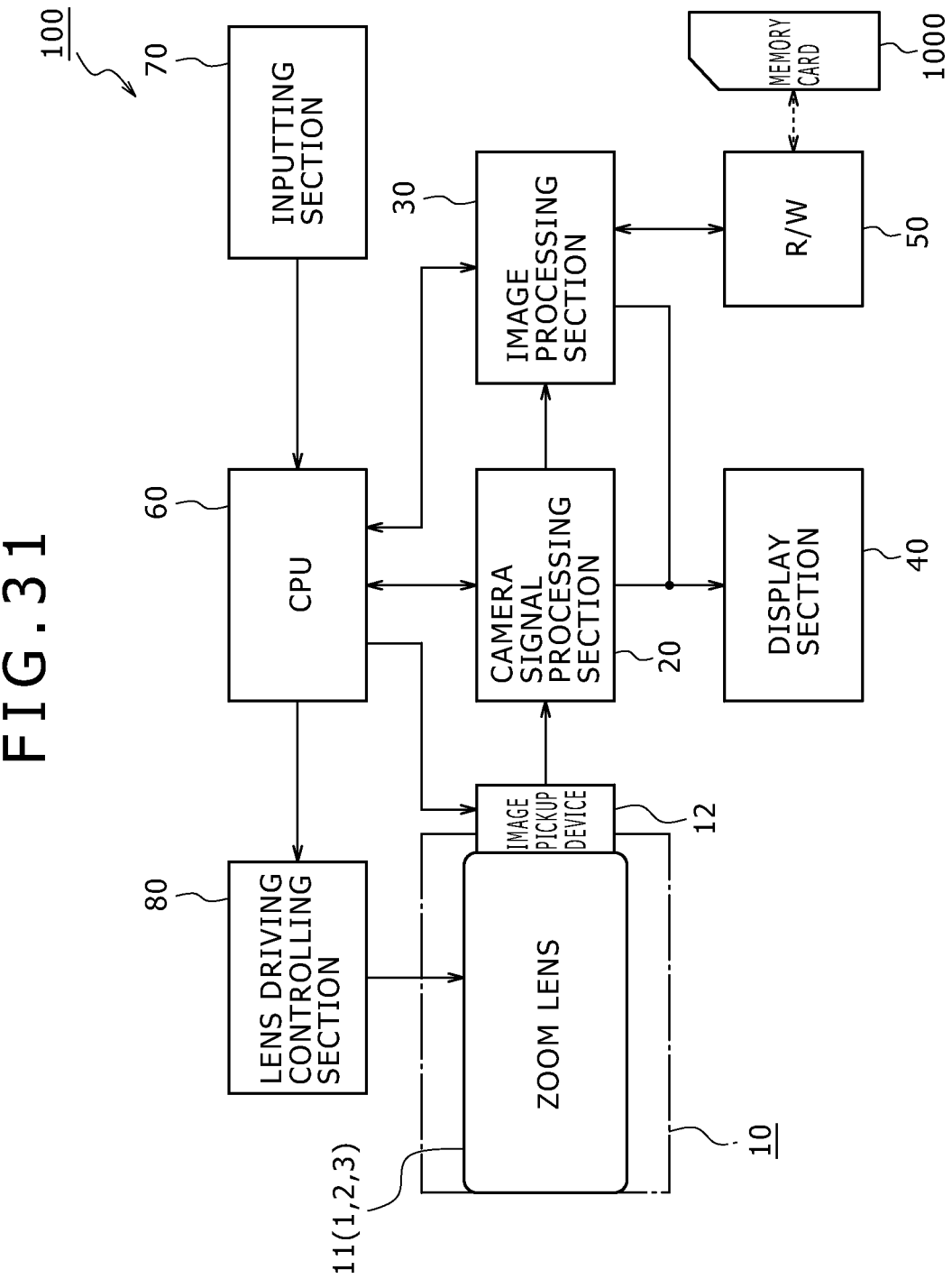
FIG. 31 is a block diagram showing an example of an image pickup apparatus.

FIG. 31 shows a block diagram of a digital still camera which is a form of the image pickup apparatus of the present technology.

Referring to FIG. 31, the image pickup apparatus 100 in the form of a digital still camera includes a camera block 10 which takes charge of an image pickup function, and a camera signal processing section 20 for carrying out signal processing of an image signal picked up by the camera block 10 such as analog to digital conversion. The image pickup apparatus 100 further includes an image processing section 30 for carrying out a recording and reproduction process of the image signal. The image pickup apparatus 100 further includes a display section 40 such as an LCD (Liquid Crystal Display) unit for displaying a picked up image and so forth thereon, and a reader/writer (R/W) 50 for carrying out writing and reading out of an image signal into and from a memory card 1000. The image pickup apparatus 100 further includes a CPU (Central Processing Unit) 60 for controlling the entire image pickup apparatus, an inputting section 70 including various switches and so forth for being operated by a user, and a lens driving controlling section 80 for controlling driving of the lens disposed in the camera block 10.

The camera block 10 is configured from an optical system including a zoom lens 11, which may be any of the zoom lenses 1, 2 and 3 to which the present technology is applied, an image pickup device 12 such as a CCD (Charge Coupled Device) image sensor or a CMOS (Complementary Metal-Oxide Semiconductor) image sensor, and so forth.

The camera signal processing section 20 carries out various signal processes for an output signal of the image pickup device 12 such as conversion into a digital signal, noise removal, picture quality correction and conversion into luminance and color difference signals.

The image processing section 30 carries out compression coding and decompression decoding processes of an image signal based on a predetermined image data format, a conversion process of data specifications of a resolution and so forth, and other necessary processes.

The display section 40 has a function of displaying thereon an operation state of the inputting section 70 by the user and various data such as a picked up image.

The reader/writer 50 carries out writing of image data encoded by the image processing section 30 into the memory card 1000 and reading out of image data recorded in the memory card 1000.

The CPU 60 functions as a controlling processing section for controlling the circuit blocks provided in the image pickup apparatus 100 and controls the circuit blocks based on an instruction input signal from the inputting section 70 and so forth.

The inputting section 70 is configured, for example, from a shutter release button for triggering a shutter motion, a selection switch for selecting an operation mode and other necessary elements. The inputting section 70 outputs an instruction input signal corresponding to an operation by the user to the CPU 60.

The lens driving controlling section 80 controls a motor and other members not shown for driving the lenses of the zoom lens 11 based on a control signal from the CPU 60.

The memory card 1000 is a semiconductor memory which is removably inserted, for example, into a slot connected to the reader/writer 50.

In the following, operation of the image pickup apparatus 100 is described.

In a standby state for image pickup, an image signal picked up by the camera block 10 is outputted to the display section 40 through the camera signal processing section 20 under the control of the CPU 60 and displayed as a camera-through image on the display section 40. On the other hand, if an instruction input signal for zooming is inputted from the inputting section 70, then the CPU 60 outputs a control signal to the lens driving controlling section 80 so that predetermined lenses of the zoom lens 11 are moved under the control of the lens driving controlling section 80.

If the shutter not shown of the camera block 10 is driven to move in response to the instruction input signal from the inputting section 70, then a picked up image signal is outputted from the camera signal processing section 20 to the image processing section 30, and subjected to a compression coding process by the image processing section 30. By the compression coding process, the image signal is converted into digital data of a predetermined data format. The resulting data is outputted to the reader/writer 50 and written into the memory card 1000.

Focusing is carried out by the lens driving controlling section 80 moving the predetermined lenses of the zoom lens 11 based on a control signal from the CPU 60, for example, when the shutter release button of the inputting section 70 is half-depressed or is fully depressed for recording or image pickup.

In order to reproduce image data recorded in the memory card 1000, predetermined image data is read out from the memory card 1000 in response to an operation for the inputting section 70 by the reader/writer 50, and a decompression decoding process is carried out for the image data by the image processing section 30. Then, a reproduction image signal is outputted from the image processing section 30 to the display section 40 so that a reproduction image is displayed on the display section 40.

It is to be noted that, while the embodiment described above is directed to an example wherein the image pickup apparatus is applied to a digital still camera, the application range of the image pickup apparatus is not limited to the digital still camera. In particular, the image pickup apparatus can be applied widely as a camera section or the like of a digital inputting and outputting apparatus such as a digital video camera, a portable telephone set in which a camera is incorporated, a PDA (Personal Digital Assistant) in which a camera is incorporated and like apparatus.

Others

In the zoom lens and the image pickup apparatus of the present technology, a lens which has substantially no lens power may be disposed, a lens group including such lens may be disposed in addition to the first to fourth lens groups. In this instance, the zoom lens and the image pickup apparatus of the present technology may be configured from substantially five or more lens groups including the lens group disposed in addition to the first to fourth lens groups.

Present Technology

Also it is possible to configure the present technology in the following manner.

<1> A zoom lens, including:

a first lens group having a positive refracting power and normally positioned at a fixed position;

a second lens group having a negative refracting power and movable in a direction of an optical axis for zooming; and a third lens group having a positive refracting power and normally positioned at a fixed position;

the first, second and third lens groups being disposed in order from the object side to the image side;

two thirds or more lenses from among a number of lenses which configure the first to third lens groups being formed from a resin material;

the zoom lens satisfying the following conditional expressions (1) and (2):

$$4.0 < ft/fw \qquad (1)$$

$$-100.0 < f1 \text{ to } 3/fw < -6.4 \qquad (2)$$

where fw is a focal length of the entire lens system in a wide angle end state, ft a focal length of the entire lens system in a telephoto end state, and f1 to 3 a combined focal length of the first to third lens groups at all zoom positions.

<2> The zoom lens according to <1> above, wherein the zoom lens satisfies the following condition expression (3):

$$-1.0 < fp1/fw < 2.5 \qquad (3)$$

where fp1 is a position of a front side principal point of the first lens group, representing a distance from a face on the most object side of the first lens group, wherein the distance on the image side has a positive sign.

<3> The zoom lens according to <1> or <2> above, wherein a fourth lens group which has a positive refracting power and is movable in the direction of the optical axis for correction of a focal position and focusing by zooming is disposed on the image side of the third lens group.

<4> The zoom lens according to <3>, wherein the fourth lens group is configured from a positive lens having a positive refracting power and a negative lens having a negative refracting power, which are disposed in order from the object side to the image side, and one of the positive lens and negative lens is formed from a glass material and the other one of the lenses is formed from a resin material.

<5> An image pickup apparatus, including:

a zoom lens; and an image pickup device for converting an optical image formed by the zoom lens into an electric signal;

the zoom lens including a first lens group having a positive refracting power and normally positioned at a fixed position, a second lens group having a negative refracting power and movable in a direction of an optical axis for zooming, and a third lens group having a positive refracting power and normally positioned at a fixed position, the first, second and third lens groups being disposed in order from the object side to the image side, two thirds or more lenses from among a number of lenses which configure the first to third lens groups being formed from a resin material, the zoom lens satisfying the following conditional expressions (1) and (2):

$$4.0 < ft/fw \qquad (1)$$

$$-100.0 < f1 \text{ to } 3/fw < -6.4 \qquad (2)$$

where fw is a focal length of the entire lens system in a wide angle end state, ft a focal length of the entire lens system in a telephoto end state, and f1 to 3 a combined focal length of the first to third lens groups at all zoom positions.

<6> The zoom lens according to any one of <1> to <4> above or the image pickup apparatus according to <5>, further including a lens having substantially no lens power.

The shapes and the numerical values of the components specified in the embodiments described hereinabove are mere examples of embodiments in carrying out the present technology, and the technical scope of the present technology shall not be interpreted restrictively by them.

The present technology contains subject matter related to that disclosed in Japanese Priority Patent Application JP 2012-010220 filed in the Japan Patent Office on Jan. 20, 2012, the entire content of which is hereby incorporated by reference.

What is claimed is:

1. A zoom lens, comprising:
   a first lens group having a positive refracting power and positioned at a fixed position;
   a second lens group having a negative refracting power and movable in a direction of an optical axis for zooming;
   a third lens group having a positive refracting power and positioned at a fixed position; and
   a fourth lens group movable in the direction of the optical axis and being disposed on the image side of the third lens group, the fourth lens group configured from a positive lens having a positive refracting power and a negative lens having a negative refracting power, the positive lens and the negative lens being disposed in this order from the object side to the image side,
   the first, second and third lens groups being disposed in order from the object side to the image side;
   two thirds or more lenses from among a number of lenses which configure the first to third lens groups being formed from a resin material;
   one of the positive lens and negative lens, in the fourth lens group, is formed from a glass material and the other one of the lenses is formed from a resin material;
   the zoom lens satisfying the following conditional expressions (1) and (2):

$$4.0 < ft/fw \qquad (1)$$

$$-100.0 < f(1 \text{ to } 3)/fw < -6.4 \qquad (2)$$

where fw is a focal length of the entire lens system in a wide angle end state, ft a focal length of the entire lens system in a telephoto end state, and f(1 to 3) is a combined focal length of the first to third lens groups at all zoom positions.

2. The zoom lens according to claim 1, wherein the fourth lens group has a positive refracting power and is movable in the direction of the optical axis for correction of a focal position and for focusing by zooming and wherein the fourth lens group is disposed on the image side of the third lens group.

3. A zoom lens, comprising:
   a first lens group having a positive refracting power and positioned at a fixed position;
   a second lens group having a negative refracting power and movable in a direction of an optical axis for zooming; and
   a third lens group having a positive refracting power and positioned at a fixed position;
   the first, second and third lens groups being disposed in order from the object side to the image side;
   two thirds or more lenses from among a number of lenses which configure the first to third lens groups being formed from a resin material;
   the zoom lens satisfying the following conditional expressions (1) and (2):

$$4.0 < ft/fw \qquad (1)$$

$$-100.0 < f(1 \text{ to } 3)/fw < -6.4 \qquad (2)$$

where fw is a focal length of the entire lens system in a wide angle end state, ft a focal length of the entire lens system in a telephoto end state, and f(1 to 3) is a combined focal length of the first to third lens groups at all zoom positions,
   wherein a fourth lens group has a positive refracting power and is movable in the direction of the optical axis for correction of a focal position and for focusing by zooming and the fourth lens group is disposed on the image side of the third lens group,
   wherein the fourth lens group is configured from a positive lens having a positive refracting power and a negative lens having a negative refracting power, which are disposed in order from the object side to the image side, and
   one of the positive lens and negative lens is formed from a glass material and the other one of the lenses is formed from a resin material.

4. An image pickup apparatus, comprising:
   a zoom lens; and
   an image pickup device for converting an optical image formed by the zoom lens into an electric signal;
   the zoom lens including
   a first lens group having a positive refracting power and positioned at a fixed position,
   a second lens group having a negative refracting power and movable in a direction of an optical axis for zooming,
   a third lens group having a positive refracting power and positioned at a fixed position, and
   a fourth lens group movable in the direction of the optical axis and being disposed on the image side of the third lens group, the fourth lens group configured from a positive lens having a positive refracting power and a negative lens having a negative refracting power, the positive lens and the negative lens being disposed in this order from the object side to the image side,
   the first, second and third lens groups being disposed in order from the object side to the image side,
   two thirds or more lenses from among a number of lenses which configure the first to third lens groups being formed from a resin material,
   one of the positive lens and negative lens, in the fourth lens group, is formed from a glass material and the other one of the lenses is formed from a resin material;
   the zoom lens satisfying the following conditional expressions (1) and (2):

$$4.0 < ft/fw \qquad (1)$$

$$-100.0 < f(1 \text{ to } 3)/fw < -6.4 \qquad (2)$$

where fw is a focal length of the entire lens system in a wide angle end state, ft a focal length of the entire lens system in a telephoto end state, and f(1 to 3) is a combined focal length of the first to third lens groups at all zoom positions.

* * * * *